(12) United States Patent
Oshima et al.

(10) Patent No.: US 7,184,869 B2
(45) Date of Patent: Feb. 27, 2007

(54) ELECTRIC VEHICLE STEERING/DRIVE CONTROL METHOD

(75) Inventors: Hiroyasu Oshima, Kanazawa (JP); Katsuya Imai, Nagano (JP)

(73) Assignee: Kanazawa Institute of Technology, Ishikawa (JP)

( * ) Notice: Subject to any disclaimer, the term of this patent is extended or adjusted under 35 U.S.C. 154(b) by 143 days.

(21) Appl. No.: 10/822,610

(22) Filed: Apr. 12, 2004

(65) Prior Publication Data

US 2004/0230361 A1   Nov. 18, 2004

(30) Foreign Application Priority Data

May 14, 2003   (JP) ............................. 2003-136158

(51) Int. Cl.
*A01B 69/00* (2006.01)

(52) U.S. Cl. .......................... 701/41; 701/22; 180/408; 180/421

(58) Field of Classification Search ................. 701/36, 701/41, 22; 180/408, 421, 443, 415, 410
See application file for complete search history.

(56) References Cited

U.S. PATENT DOCUMENTS

| | | | |
|---|---|---|---|
| 5,348,111 A | 9/1994 | Williams et al. | 180/415 |
| 5,379,220 A | 1/1995 | Allen et al. | 701/41 |
| 5,404,960 A | 4/1995 | Wada et al. | 180/446 |
| 5,453,930 A | 9/1995 | Imaseki et al. | 701/22 |
| 5,465,806 A | 11/1995 | Higasa et al. | 180/165 |
| 5,996,722 A | 12/1999 | Price | 180/403 |
| 6,449,552 B2 | 9/2002 | Ohba et al. | 701/89 |
| 6,549,835 B2 | 4/2003 | Deguchi et al. | 701/41 |
| 6,827,176 B2* | 12/2004 | Bean et al. | 180/411 |
| 6,871,125 B2* | 3/2005 | Oshima et al. | 701/22 |
| 2004/0186647 A1* | 9/2004 | Ono | 701/70 |

* cited by examiner

*Primary Examiner*—Gertrude Arthur-Jeanglaude
(74) *Attorney, Agent, or Firm*—Brinks Hofer Gilson & Lione

(57) ABSTRACT

In steering control for individually controlling wheel steering angles $\alpha_1$, $\alpha_2$, $\alpha_3$, and $\alpha_4$ of a vehicle in accordance with a condition equation for forming a prescribed mode, one of the condition equation variables is used as a steering command value S. In a process for changing the command value S from a value $S_1$ to a value $S_2$, for transitioning the steering angles $\alpha_1$, $\alpha_2$, $\alpha_3$, $\alpha_4$ from values $[\alpha_1, \alpha_2, \alpha_3, \alpha_4]_{S1}$ corresponding to the steering command value $S_1$, to values $[\alpha_1, \alpha_2, \alpha_3, \alpha_4]_{S2}$ corresponding to the steering command value $S_2$, the steering angles $\alpha_1$, $\alpha_2$, $\alpha_3$, $\alpha_4$ are changed toward incremental transition steering angles $[\alpha_1, \alpha_2, \alpha_3, \alpha_4]_{S1+\Delta S}$ corresponding to a steering command value $(S_1+\Delta S)$, which is the steering command value $S_1$ to which an incremental steering command value $\Delta S$ has been added. After the steering angles $\alpha_1$, $\alpha_2$, $\alpha_3$, $\alpha_4$ reach their incremental transition steering angles and steering angle conformance is detected, the angles are changed toward incremental transition steering angles $[\alpha_1, \alpha_2, \alpha_3, \alpha_4]_{S1+n\Delta S}$ corresponding to a steering command value $(S_1+n\Delta S)$, which is the steering command value to which an incremental steering command value $\Delta S$ has been added [n times] in succession. This is repeated as many times as required to change the steering angles $\alpha_1$, $\alpha_2$, $\alpha_3$, $\alpha_4$ from $[\alpha_1, \alpha_2, \alpha_3, \alpha_4]_{S1}$ to $[\alpha_1, \alpha_2, \alpha_3, \alpha_4]_{S2}$.

20 Claims, 9 Drawing Sheets

Steering Angles α1 Through α4 When α₀ is Used as the Steering Command Value (Steering Mode M1)

Steering Angles α1 and α2 When α₀ is Used as the Steering Command Value (Steering Mode M3)

ELECTRIC VEHICLE STEERING/DRIVE CONTROL METHOD

RELATED APPLICATIONS

This application is related to application Ser. No. 10/294,113 entitled "ELECTRIC VEHICLE STEERING/DRIVE CONTROL METHOD, ELECTRIC VEHICLE STEERING/DRIVE CONTROL APPARATUS, AND ELECTRIC VEHICLE", filed on Nov. 14, 2002, the entire specification of which is incorporated herein by reference for all purposes as if fully set forth herein. This application claims priority under 35 U.S.C. § 119 to Japanese Patent Application No. 2003-136158 filed May 14, 2003, the entire content of which is hereby incorporated by reference.

BACKGROUND OF THE INVENTION

1. Field of the Invention

The present invention relates to a steering control method for vehicles—especially electric vehicles—having four-wheel-independent steering. In particular, it relates to a vehicle steering control method for safely and smoothly operating a vehicle in a steering mode adapted to the constraints of passageways in facilities in which the vehicle is being driven, and to the placement of objects adjacent to those passageways. In the present application, the term 'steering mode' denotes a basic pattern of travel paths described by the wheels of a vehicle being steered.

2. Background Art

Previously, in JP Patent Application No. 2001-351127, the inventors proposed a method for controlling operation of an electric vehicle with four-wheel-independent steering for steering in a wide variety of indoor/outdoor facilities such as hospitals, nursing homes, supply distribution bases, computer warehouses, large commercial facilities, libraries, sports/entertainment complexes, amusement parks, etc., by using steering modes adapted to conform to the constraints associated with the passageways in such indoor/outdoor facilities, and to the placement of objects in close proximity to the passageways.

The specification of that prior JP Patent Application No. 2001-351127 describes how the steering of an electric vehicle in which steering/drive control is performed through separate drive motors and steering motors for each of its four wheels (left front, right front, left rear and right rear) in a number of different steering modes M1, M2, M3, M4, and M5. The specification describes, as examples of steering modes, an M1 steering mode wherein the travel paths of the right and left rear wheels follow in the paths of the right and left front wheels; an M2 steering mode wherein the travel paths of the front and rear wheels run parallel to each other; an M3 steering mode wherein the rear wheel turning path relative to the front wheel turning path is an 'inside wheel difference path;' an M4 steering mode wherein the vehicle turns to the right around the right rear wheel as the center of rotation of the turn, and turns to the left around the left rear wheel as the center of rotation of the turn; and an M5 steering mode wherein the vehicle turns to the right with the right front wheel as the center of rotation of the turn, and turns to the left with the left front wheel as the center of rotation of the turn. Also proposed in this application is a steering control method wherein a mode is selected from the M1, M2, M3, M4 and M5 steering modes as the mode best adapted to the conditions of the passageway to be driven; and the rotation of each steering motor and each drive motor then is controlled such that the steering angles $\alpha_1, \alpha_2, \alpha_3, \alpha_4$, and rotation speeds n1, n2, n3, n4, of the respective wheels conform to 'steering constraint condition equations' (hereinafter shortened to 'condition equation') that define the conditions that must exist in order to execute the selected prescribed steering mode.

The following equations were proposed as steering constraint condition equations (condition equations) for the above steering modes.

For the M1 steering mode:

$$\alpha_1 = -\alpha_3 = \tan^{-1}\left(\frac{L}{R-W}\right) \tag{E11}$$

$$\alpha_2 = -\alpha_4 = \tan^{-1}\left(\frac{L}{R+W}\right) \tag{E12}$$

$$n_1:n_2:n_3:n_4 = \sqrt{(R-W)^2+L^2}:\sqrt{(R+W)^2+L^2}:\sqrt{(R-W)^2+L^2}:\sqrt{(R+W)_2L^2} \tag{E13}$$

For the M2 steering mode:

$$\alpha_1 = \alpha_2 = \alpha_3 \alpha_4 \tag{E21}$$

$$n_1 = n_2 = n_3 = n_4 \tag{E22}$$

For the M3 steering mode:

$$\alpha_1 = \tan^{-1}\left(\frac{2L}{R-W}\right) \tag{E31}$$

$$\alpha_2 = \tan^{-1}\left(\frac{2L}{R+W}\right) \tag{E32}$$

$$\alpha_3 = \alpha_4 = 0 \tag{E33}$$

$$n_1:n_2:n_4 = \sqrt{(R-W)^2+(2L)^2}:\sqrt{(R+W)^2+(2L)^2}:|R-W|:|R+W| \tag{E34}$$

In the M4 steering mode, for a right turn:

$$\alpha_1 = \frac{\pi}{2} \tag{E41}$$

$$\alpha_2 = \tan^{-1}\left(\frac{L}{W}\right) \tag{E42}$$

$$\alpha_3 = \alpha_4 = 0 \tag{E43}$$

$$n_1:n_2:n_3:n_4 = L:\sqrt{W^2+L^2}\,0:W \tag{E44}$$

and for a left turn:

$$\alpha_1 = \tan^{-1}\left(-\frac{L}{W}\right) \tag{E45}$$

$$\alpha_2 = -\frac{\pi}{2} \tag{E46}$$

$$\alpha_3 = \alpha_4 = 0 \tag{E47}$$

$$n_1:n_2:n_3:n_4 = \sqrt{W^2+L^2}\,L:W:0 \tag{E48}$$

In the M5 steering mode, for a right turn:

$$\alpha_1=\alpha_2=0 \quad (E51)$$

$$\alpha_3 = -\frac{\pi}{2} \quad (E52)$$

$$\alpha_4 = \tan^{-1}\left(-\frac{L}{W}\right) \quad (E53)$$

$$n_1:n_2:n_3:n_4=0:W:L\sqrt{W^2+L^2} \quad (E54)$$

and for a left turn:

$$\alpha_1=\alpha_2=0 \quad (E55)$$

$$\alpha_3 = \tan^{-1}\left(\frac{L}{W}\right) \quad (E56)$$

$$\alpha_4 = \frac{\pi}{2} \quad (E57)$$

$$n_1:n_2:n_3:n_4=W:0:\sqrt{W^2+L^2}:L \quad (E58)$$

where, in the above equations, $\alpha_1$ is the steering angle for the right front wheel,
$\alpha_2$ is the steering angle for the left front wheel,
$\alpha_3$ the steering angle for the right rear wheel,
$\alpha_4$ is the steering angle for the left rear wheel,
$n_1$ is the rotation speed for the right front wheel,
$n_2$ is the rotation speed for the left front wheel,
$n_3$ is the rotation speed for the right rear wheel,
$n_3$ is the rotation speed for the left rear wheel,
L is the distance between each wheel and a center-line X between the front and rear wheels,
W is the distance between each wheel and a center-line Y between the left and right wheels, and
R, for the case in which the turning paths of the wheels inscribe concentric arcs, is the distance between the center of the concentric arcs and a point central to the locations of the four wheels (the distance from the center of the vehicle to the vehicle's center of rotation; i.e., the radius of vehicle rotation).

The problem with this, however, is that to change the vehicle's direction of travel, a steering command is issued with the distance R (vehicle turning radius) as a steering command value for increasing or decreasing the R setting of the existing steering command value, thus to cause the steering angles of the wheels ($\alpha_1$, $\alpha_2$, $\alpha_3$, $\alpha_4$) to increase or decrease as required to conform to the above equations. When the steering command value R is changed from an existing value $R_1$ to a desired value $R_2$, however, it takes a small amount of time ('steering command lag time') before the wheel steering angles ($\alpha_1$, $\alpha_2$, $\alpha_3$, $\alpha_4$) reach the new values required to satisfy the above equations. In the steering process, during this steering command lag time, the left and right wheels may point [severely] outward (toe-out) or [severely] inward (toe-in) with respect to the vehicle's direction of travel. (These toe-out and toe-in phenomena are referred to in general as the 'toe-in/out phenomenon') If [severe] toe-in/out occurs during the steering process, it can apply enough force to the steering mechanism to damage it. It can also destabilize objects and people riding in or on the vehicle, creating a dangerous situation.

For a driver actually operating this vehicle, it would be difficult to grasp, in an intuitive or physical sense, how the distance R is related to the steering angles of the wheels (direction of travel of the vehicle). Moreover, the value of the distance R can invert, going abruptly from $-\infty$ to $+\infty$ (full left to full right), or from $+\infty$ to $-\infty$ (full right to full left) with the direction of travel of the vehicle as the left/right dividing line. Therefore, from the standpoint of practical driving considerations, it would not be desirable to use such discontinuous changes in the distance R as a steering angle setting parameter for setting steering command values for the steering angles $\alpha_1$, $\alpha_2$, $\alpha_3$, $\alpha_4$.

SUMMARY OF THE INVENTION

The present invention was devised with the above problems in mind. It was devised to prevent the occurrence of [severe] toe-in/out phenomena in the steering process of a four-wheel-independent steering vehicle. Also, the present invention provides for the use of steering command values other than a distance R corresponding to the rotation radius (turning radius) of the vehicle. By using, instead of the distance R, an easily understandable steering command value such that the physical relationship between the steering command value and the vehicle's direction of travel will be reflected in the feel of the steering to a driver of the vehicle, the invention can prevent steering errors by drivers, and enable them to quickly and accurately steer the vehicle in the desired direction. It will also prevent collisions by preventing vehicles from taking off in the wrong direction when starting out from a stopped state, or when changing steering modes.

In the present invention, to prevent [severe] toe-in/toe-out phenomena from occurring in a four-wheel-independent-steering vehicle steering process, steering control is performed wherein, by changing a steering command value, for changing the direction of travel of a vehicle by separately controlling steering angles $\alpha_1$, $\alpha_2$, $\alpha_3$, $\alpha_4$ of the four wheels in accordance with steering constraint condition equations for forming a prescribed steering mode, one of the variables of the steering constraint condition equation is used as a steering command value S; in a process for changing the steering command value S from a value $S_1$ to a value $S_2$ for transitioning the steering angles $\alpha_1$, $\alpha_2$, $\alpha_3$, $\alpha_4$ from the values $[\alpha_1, \alpha_2, \alpha_3, \alpha_4]_{S1}$, which correspond to the command value $S_1$, to the values $[\alpha_1, \alpha_2, \alpha_3, \alpha_4]_{S2}$, which correspond to the command value $S_2$, incremental transition steering angles $[\alpha_1, \alpha_2, \alpha_3, \alpha_4]_{S1+\Delta S}$ corresponding to the steering command value $(S_1+\Delta S)$, which is the steering command value $S_1$ to which an incremental steering command value $\Delta S$ has been added, are computed as values that satisfy said steering constraint condition equation; the steering angles $\alpha_1$, $\alpha_2$, $\alpha_3$, $\alpha_4$ are changed toward the incremental transition steering angles $[\alpha_1, \alpha_2, \alpha_3, \alpha_4]_{S1+\Delta S}$; after the steering angles $\alpha_1$, $\alpha_2$, $\alpha_3$, $\alpha_4$ have reached the incremental transition steering angles $[\alpha_1, \alpha_2, \alpha_3, \alpha_4]_{S1+\Delta S}$, and steering angle conformance has been detected, incremental transition steering angles $[\alpha_1, \alpha_2, \alpha_3, \alpha_4]_{S1+2\Delta S}$ corresponding to the steering command value $(S_1+2\Delta S)$, which is the steering command value $(S_1+\Delta S)$ to which an additional incremental steering command value $\Delta S$ has been added, are computed as values that satisfy said steering constraint condition equation; the steering angles $\alpha_1$, $\alpha_2$, $\alpha_3$, $\alpha_4$ are changed toward the incremental transition steering angles $[\alpha_1, \alpha_2, \alpha_3, \alpha_4]_{S1+2\Delta S}$; from this point on, after steering angle conformance of the steering angles $\alpha_1$, $\alpha_2$, $\alpha_3$, $\alpha_4$ has been detected, incremental transition steering angles $[\alpha_1, \alpha_2, \alpha_3, \alpha_4]_{S1+n\Delta S}$ corresponding to the steering command value $(S_1+n\Delta S)$, which is the steering command value $S_1$ to which the incremental steering command value $\Delta S$ has been added [n times] in succession, are computed as values that satisfy said steering constraint condition equations; the steering angles $\alpha_1, \alpha_2, \alpha_3, \alpha_4$ are changed toward the incremental transition steering angles $[\alpha_1, \alpha_2, \alpha_3, \alpha_4]_{S1+n\Delta S}$; arrival of the steering angles $\alpha_1, \alpha_2, \alpha_3, \alpha_4$ at the incremental transition steering angles $[\alpha_1, \alpha_2, \alpha_3, \alpha_4]_{S1+n\Delta S}$ in steering angle conformance is detected; and the process is repeated until the steering angles $\alpha_1, \alpha_2, \alpha_3, \alpha_4$ have been changed from the steering angles $[\alpha_1, \alpha_2, \alpha_3, \alpha_4]_{S1}$ to the steering angles $[\alpha_1, \alpha_2, \alpha_3, \alpha_4]_{S2}$.

When synchronous or induction motors are used as wheel drive motors, steering is controlled by individually changing the steering angles $\alpha_1, \alpha_2, \alpha_3, \alpha_4$ and speeds of rotation $n1, n2, n3, n4$ of the respective wheels. That is, steering control of a four-wheel-independent steering vehicle is effected such that by changing a steering command value, for changing the direction of travel of a vehicle by separately controlling steering angles $\alpha_1, \alpha_2, \alpha_3, \alpha_4$ and speeds of rotation $n1, n2, n3, n4$ of the four wheels in accordance with steering constraint condition equations for forming a prescribed steering mode, one of the variables of the steering constraint condition equation is used as a steering command value S, in a process for changing the steering command value S from a value $S_1$ to a value $S_2$ for transitioning the steering angles $\alpha_1, \alpha_2, \alpha_3, \alpha_4$ from the values $[\alpha_1, \alpha_2, \alpha_3, \alpha_4]_{S1}$, which correspond to the command value $S_1$, to the values $[\alpha_1, \alpha_2, \alpha_3, \alpha_4]_{S2}$, which correspond to the command value $S_2$, incremental transition steering angles $[\alpha_1, \alpha_2, \alpha_3, \alpha_4]_{S1+\Delta S}$ and incremental transition speeds of rotation $[n1, n2, n3, n4]_{S1+\Delta S}$ corresponding to the steering command value $(S_1+\Delta S)$, which is the steering command value $S_1$ to which an incremental steering command value $\Delta S$ has been added, are computed as values that satisfy said steering constraint condition equations; the steering angles $\alpha_1, \alpha_2, \alpha_3, \alpha_4$ and speeds of rotation $n1, n2, n3, n4$ are changed toward the incremental transition steering angles $[\alpha_1, \alpha_2, \alpha_3, \alpha_4]_{S1+\Delta S}$ and incremental speeds of rotation $[n1, n2, n3, n4]_{S1+\Delta S}$; after the steering angles $\alpha_1, \alpha_2, \alpha_3, \alpha_4$ have reached the incremental transition steering angles $[\alpha_1, \alpha_2, \alpha_3, \alpha_4]_{S1+\Delta S}$, and steering angle conformance has been detected, incremental transition steering angles $[\alpha_1, \alpha_2, \alpha_3, \alpha_4]_{S1+2\Delta S}$ and incremental transition speeds of rotation $[n1, n2, n3, n4]_{S1+2\Delta S}$ corresponding to the steering command value $(S_1+2\Delta S)$, which is the steering command value $(S_1+\Delta S)$ to which an additional incremental steering command value $\Delta S$ has been added, are computed as values that satisfy said steering constraint condition equations; the steering angles $\alpha_1, \alpha_2, \alpha_3, \alpha_4$ and speeds of rotation $n1, n2, n3, n4$ are changed toward the incremental transition steering angles $[\alpha_1, \alpha_2, \alpha_3, \alpha_4]_{S1+2\Delta S}$ and incremental transition speeds of rotation $[n1, n2, n3, n4]_{S1+2\Delta S}$; from this point on, after steering angle conformance of the steering angles $\alpha_1, \alpha_2, \alpha_3, \alpha_4$ is detected, incremental transition steering angles $[\alpha_1, \alpha_2, \alpha_3, \alpha_4]_{S1+n\Delta S}$ and incremental transition speeds of rotation $[n1, n2, n3, n4]_{S1+n\Delta S}$ corresponding to the steering command value $(S_1+n\Delta S)$, which is the command value $S_1$ to which the incremental steering command value $\Delta S$ has been added [n times] in succession, are computed as values that satisfy said steering constraint condition equations; the steering angles $\alpha_1, \alpha_2, \alpha_3, \alpha_4$ and speeds of rotation $n1, n2, n3, n4$ are changed toward the incremental transition steering angles $[\alpha_1, \alpha_2, \alpha_3, \alpha_4]S1+n\Delta S$ and incremental transition speeds of rotation $[n1, n2, n3, n4]_{S1, +n\Delta S}$; arrival of the steering angles $\alpha_1, \alpha_2, \alpha_3, \alpha_4$ at the incremental transition steering angles $[\alpha_1, \alpha_2, \alpha_3, \alpha_4]_{S1+n\Delta S}$ in steering angle conformance is detected; and the process is repeated until the steering angles $\alpha_1, \alpha_2, \alpha_3, \alpha_4$ have been changed from the steering angles $[\alpha_1, \alpha_2, \alpha_3, \alpha_4]_{S1}$ to the steering angles $[\alpha_1, \alpha_2, \alpha_3, \alpha_4]_{S2}$.

As one example of a steering command value that is actually used, for the case wherein the turning-vehicle-travel-paths of the wheels are concentric arcs, a distance R, which is the distance between a point central to the positions of the four wheels and a center point of said concentric arcs, is used as the command value. That is, steering control of a four-wheel-independent steering vehicle is effected such that by changing a steering command value, the direction of travel of a vehicle is changed by separately controlling the steering angles $\alpha_1, \alpha_2, \alpha_3, \alpha_4$ of the four wheels of the vehicle in accordance with steering constraint condition equations for forming a prescribed mode, wherein for the case wherein the turning-vehicle-travel-paths of the wheels are concentric arcs, a command value is defined as a distance R, which is the distance between a point central to the positions of the four wheels, and a center point of said concentric arcs, in a process for changing the command value R from a value $R_1$ to a value $R_2$, for transitioning the steering angles $\alpha_1, \alpha_2, \alpha_3, \alpha_4$ from the values $[\alpha_1, \alpha_2, \alpha_3, \alpha_4]_{R1}$, which correspond to the command value $R_1$, to the values $[\alpha_1, \alpha_2, \alpha_3, \alpha_4]_{R2}$, which correspond to the command value $R_2$; incremental transition steering angles $[\alpha_1, \alpha_2, \alpha_3, \alpha_4]_{R1+\Delta R}$ corresponding to the steering command value $(R_1+\Delta R)$, which is the steering command value $R_1$ to which an incremental steering command value $\Delta R$ has been added, are computed as values that will satisfy said steering constraint condition equations; the steering angles $\alpha_1, \alpha_2, \alpha_3, \alpha_4$ are changed toward the incremental transition steering angles $[\alpha_1, \alpha_2, \alpha_3, \alpha_4]_{R1+\Delta R}$; when the steering angles $\alpha_1, \alpha_2, \alpha_3, \alpha_4$ have reached the incremental transition steering angles $[\alpha_1, \alpha_2, \alpha_3, \alpha_4]_{R1+\Delta R}$ and steering angle conformance has been detected, incremental transition steering angles $[\alpha_1, \alpha_2, \alpha_3, \alpha_4]_{R1+2\Delta R}$ corresponding to the steering command value $(R_1+2\Delta R)$, which is the steering command value $(R_1+\Delta R)$ to which an additional incremental steering command value $\Delta R$ has been added, are computed as values that satisfy said steering constraint condition equations; the steering angles $\alpha_1, \alpha_2, \alpha_3, \alpha_4$ are changed toward the incremental transition steering angles $[\alpha_1, \alpha_2, \alpha_3, \alpha_4]_{R1+2\Delta R}$, and from this point on, proceeding in the same manner as above, when, steering angle conformance has been detected, incremental transition steering angles $[\alpha_1, \alpha_2, \alpha_3, \alpha_4]_{R1+n\Delta R}$ corresponding to the steering command value $(R_1+n\Delta R)$, which is the command value $R_1$ to which the incremental steering command value $\Delta R$ has been added [n times] in succession, are computed as values that satisfy said steering constraint condition equations; the steering angles $\alpha_1, \alpha_2, \alpha_3, \alpha_4$ are changed toward the incremental transition steering angles $[\alpha_1, \alpha_2, \alpha_3, \alpha_4]_{R1+n\Delta R}$; and when the steering angles $\alpha_1, \alpha_2, \alpha_3, \alpha_4$ have reached the incremental transition steering angles $[\alpha_1, \alpha_2, \alpha_3, \alpha_4]R_{1+n\Delta R}$ and steering angle conformance has been detected, the above process is repeated, continuing until the respective steering angles $\alpha_1, \alpha_2, \alpha_3, \alpha_4$ have been changed from the steering angles $[\alpha_1, \alpha_2, \alpha_3, \alpha_4]_{R1}$ to the steering angles $[\alpha_1, \alpha_2, \alpha_3, \alpha_4]_{R2}$.

Also, to control steering in a four-wheel-independent-steering vehicle in which the wheel drive motors are synchronous or induction motors, for case wherein the turning-vehicle-travel-paths of the wheels are concentric arcs, a steering command value is defined as a distance R, which is the distance between a point central to the positions of the four wheels, and a center point of said concentric arcs, in a process for changing the command value R from a value $R_1$ to a value $R_2$, for transitioning the steering angles $\alpha_1, \alpha_2, \alpha_3$, $\alpha_4$ from the values $[\alpha_1, \alpha_2, \alpha_3, \alpha_4]_{R1}$, which correspond to the command value $R_1$, to the values $[\alpha_1, \alpha_2, \alpha_3, \alpha_4]_{R2}$, which correspond to the command value $_{R2}$; incremental transition steering angles $[\alpha_1, \alpha_2, \alpha_3, \alpha_{4\alpha1, \alpha2, \alpha3, \alpha4}]_{R1+\Delta R}$ and incremental transition speeds of rotation $[n1, n2, n3, n4]_{R1+\Delta R}$ corresponding to the steering command value $(R_1+\Delta R)$, which is the steering command value $R_1$ to which an incremental steering command value $\Delta R$ has been added, are computed as values that will satisfy said steering constraint condition equations; the steering angles $\alpha_1, \alpha_2, \alpha_3, \alpha_4$ are changed toward the incremental transition steering angles $[\alpha_1, \alpha_2, \alpha_3, \alpha_4]_{R1+\Delta R}$ and speeds of rotation n1, n2, n3, n4 are changed toward the incremental transition speeds of rotation $[n1, n2, n3, n4]_{R1+\Delta R}$; when the steering angles $\alpha_1, \alpha_2, \alpha_3, \alpha_4$ have reached the incremental transition steering angles $[\alpha_1, \alpha_2, \alpha_3, \alpha_4]_{R1+\Delta R}$ and steering angle conformance has been detected, incremental transition steering angles $[\alpha_1, \alpha_2, \alpha_3, \alpha_4]_{R1+2\Delta R}$ and incremental transition speeds of rotation $[n1, n2, n3, n4]_{R1+2\Delta R}$ corresponding to the steering command value $(R_1+2\Delta R)$, which is the steering command value $(R_1+\Delta R)$ to which an additional incremental steering command value $\Delta R$ has been added, are computed as values that satisfy said steering constraint condition equations; the steering angles $\alpha_1, \alpha_2, \alpha_3, \alpha_4$ are changed toward the incremental transition steering angles $[a_1, \alpha_2, \alpha_3, \alpha_4]_{R1+2\Delta R}$ and the speeds of rotation n2, n2, n3, n4 are changed toward incremental transition speeds of rotation $[n1, n2, n3, n4]_{R1+2\Delta R}$; and from this point on, proceeding in the same manner as above, after steering angle conformance has been detected, incremental transition steering angles $[\alpha_1, \alpha_2, \alpha_3, \alpha_4]_{R1+n\Delta R}$ and incremental transition speeds of rotation $[n1, n2, n3, n4]_{R1+n\Delta R}$ corresponding to the steering command value $(R_1+n\Delta R)$, which is the command value $R_1$ to which the incremental steering command value $\Delta R$ has been added [n times] in succession, are computed as values that satisfy said steering constraint condition equations; the steering angles $\alpha_1, \alpha_2, \alpha_3, \alpha_4$ are changed toward the incremental transition steering angles $[\alpha_1, \alpha_2, \alpha_3, \alpha_4]_{R1+n\Delta R}$ and the speeds of rotation n1, n2, n3, n4 are changed toward incremental transition speeds of rotation $[n1, n2, n3, n4]_{R1+n\Delta R}$, and when the steering angles $\alpha_1, \alpha_2, \alpha_3, \alpha_4$ have reached the incremental transition steering angles $[\alpha_1, \alpha_2, \alpha_3, \alpha_4]_{R1+n\Delta R}$ and steering angle conformance has been detected, the above process is repeated, continuing until the respective steering angles $\alpha_1, \alpha_2, \alpha_3, \alpha_4$ have been changed from the steering angles $[\alpha_1, \alpha_2, \alpha_3, \alpha_4]_{R1}$ to the steering angles $[\alpha_1, \alpha_2, \alpha_3, \alpha_4]_{R2}$.

Also, steering constraint condition equations for forming prescribed steering modes are disclosed. As examples, equations for two steering modes that would probably be used as the prescribed mode most often will be presented. One of these is a mode in which, during turns, the left and right rear wheels follow in the travel paths of the left and right front wheels, respectively (referred to herein as 'steering mode M1'), and the other is a mode in which, during turns, the travel paths of the rear wheels constitute 'inside wheel difference' paths with respect to the travel paths of the front wheels (referred to herein as 'steering mode M3').

For forming the steering mode M1, the steering constraint condition equations are:

$$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

and $$n_1:n_2:n_3:n_4 = \sqrt{(R-W)^2+L^2}:\sqrt{(R+W)^2+L^2}:\sqrt{(R-W)^2+L^2}:\sqrt{(R+W)^2+L^2}$$

and for forming the steering mode M3, the steering constraint condition equations are:

$$\alpha_1 = \tan^{-1}\left(\frac{2L}{R-W}\right)$$

$$\alpha_2 = \tan^{-1}\left(\frac{2L}{R+W}\right)$$

$$\alpha_3 = \alpha_4 = 0$$

and $$n_1:n_2:n_3:n_4 = \sqrt{(R-W)^2+(2L)^2}:\sqrt{(R+W)^2+(L2)^2}:|R-W|:|R+W|$$

where $\alpha_1, \alpha_2, \alpha_3,$ and $\alpha_4$, are the steering angles of the right front wheel, left front wheel, right rear wheel, and left rear wheel, respectively;

n1, n2, n3, and n4 are the speeds of rotation of the right front wheel, left front wheel, right rear wheel, and left rear wheel, respectively;

L is the distance between the wheels and a center line X between the front wheels and rear wheels;

W is the distance between the wheels and a center line Y between the left wheels and right wheels; and R, which is used as the command value, is the distance between a point central to the positions of the four wheels and a center point of said concentric arcs.

Note that when there is no need to forcibly control the speeds of rotation n1, n2, n3, and n4 of the right front, left front, right rear and left rear wheels, respectively, the above equations related to n1, n2, n3 and n4 are not required.

Also, in the present invention, a command value that conforms more closely to the driver's sense of steering direction is used, thus preventing driver operation errors, and enabling the driver to steer in the desired direction with greater certainty. That is, instead of using the distance R (a distance equivalent to the turning radius of the vehicle) as the command value, either an angle an, which is the angle formed between a center line Y (the center line between the left wheels and right wheels of the vehicle) and the direction of travel of a point Pn (an arbitrarily located point on the vehicle); or an angle $\alpha_0$, which is the angle formed between the center line Y and a point Po (the center point of a line connecting the left and right front wheels of the vehicle) can be used.

That is, in the present invention, steering control of a four-wheel-independent-steering vehicle is performed such that in steering control wherein, by changing how a steering command value taken for changing the direction of travel of a vehicle by separately controlling steering angles $\alpha_1, \alpha_2, \alpha_3, \alpha_4$ of the four wheels in accordance with steering constraint condition equations for forming a prescribed steering mode, an angle $\alpha_n$, the angle formed between a center line Y between the left and right wheels of the vehicle, and the direction of travel of an arbitrary point Pn on the vehicle is used as a steering command value; in a process for changing the steering command value $\alpha_n$ from a value $\alpha_{n1}$ to a value $\alpha_{n2}$ for transitioning the steering angles $\alpha_1$, $\alpha_2$, $\alpha_3$, $\alpha_4$ from the values $[\alpha_1, \alpha_2, \alpha_3, \alpha_4]_{\alpha n1}$, which correspond to the command value $\alpha_{n1}$, to the values $[\alpha_1, \alpha_2, \alpha_3, \alpha_4]_{\alpha n2}$, which correspond to the command value $\alpha_{n2}$, incremental transition steering angles $[\alpha_1, \alpha_2, \alpha_3, \alpha_4]_{\alpha n1+\Delta\alpha n}$ corresponding to the steering command value $(\alpha_{n1}+\Delta\alpha_n)$, which is the steering command value $\alpha_{n1}$ to which an incremental steering command value $\Delta\alpha_n$ has been added, are computed as values that satisfy said steering constraint condition equation; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha n1+\Delta\alpha n}$; after the steering angles $\alpha_1$, $\alpha_2$, $\alpha_3$, $\alpha_4$ have reached the incremental transition steering angles $[\alpha_1, \alpha_2, \alpha_3, \alpha_4]_{\alpha n1+\Delta\alpha n}$, and steering angle conformance has been detected, incremental transition steering angles $[\alpha_1, \alpha_2, \alpha_3, \alpha_4]_{\alpha n1+2\Delta\alpha n}$ corresponding to the steering command value $(\alpha_{n1}+2\Delta\alpha_n)$, which is the steering command value $\alpha_{n1}$ to which an additional incremental steering command value $\Delta\alpha_n$ has been added, are computed as values that satisfy said steering constraint condition equation; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha n1+2\Delta\alpha n}$; from this point on, after steering angle conformance of steering angles $\alpha_1$, $\alpha_2$, $\alpha_3$, $\alpha_4$ has been detected, incremental transition steering angles $[\alpha_1, \alpha_2, \alpha_3, \alpha_4]_{\alpha n1+n\Delta\alpha n}$ corresponding to the steering command value $(\alpha n_1+n\Delta\alpha n)$, which is the command value $\alpha n_1$ to which the incremental steering command value $\Delta\alpha n$ has been added [n times] in succession, are computed as values that satisfy said steering constraint condition equations; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha n1+n\Delta\alpha n}$; arrival of the steering angles $\alpha_1$, $\alpha_2$, $\alpha_3$, $\alpha_4$ at the incremental transition steering angles $[\alpha_1, \alpha_2, \alpha_3, \alpha_4]_{\alpha n1+n\Delta\alpha n}$ in steering angle conformance is detected; and the process is repeated until the steering angles $\alpha_1$, $\alpha_2$, $\alpha_3$, $\alpha_4$ have been changed from the steering angles $[\alpha_1, \alpha_2, \alpha_3, \alpha_4]_{\alpha n1}$ to the steering angles $[\alpha_1, \alpha_2, \alpha_3, \alpha_4]_{\alpha n2}$.

Also, as an alternative, steering control of a four-wheel-independent-steering vehicle may be performed such that in steering control wherein by changing how a steering command value is taken for changing the direction of travel of a vehicle by separately controlling steering angles $\alpha_1$, $\alpha_2$, $\alpha_3$, $\alpha_4$ and speeds of rotation n1, n2, n3, n4 of the four wheels in accordance with steering constraint condition equations for forming a prescribed steering mode, an angle $\alpha_n$, the angle formed between a center line Y between the left and right wheels of the vehicle, and the direction of travel of an arbitrary point Pn on the vehicle is used as a steering command value; in a process for changing the steering command value $\alpha_n$ from a value $\alpha_{n1}$ to a value $\alpha_2$ for transitioning the steering angles $\alpha_1$, $\alpha_2$, $\alpha_3$, $\alpha_4$ from the values $[\alpha_1, \alpha_2, \alpha_3, \alpha_4]_{\alpha n1}$, which correspond to the command value $\alpha_{n1}$, to the values $[\alpha_1, \alpha_2, \alpha_3, \alpha_4]_{\alpha n2}$, which correspond to the command value $\alpha_{n2}$, incremental transition steering angles $[\alpha_1, \alpha_2, \alpha_3, \alpha_4]_{\alpha n1+\Delta\alpha n}$ and incremental transition speeds of rotation $[n1, n2, n3, n4]_{\alpha n1+\Delta\alpha n}$ corresponding to the steering command value $(\alpha_{n1}+\Delta\alpha_n)$, which is the steering command value $\alpha_{n1}$ to which an incremental steering command value $\Delta\alpha_n$ has been added, are computed as values that satisfy said steering constraint condition equation; the steering angles $\alpha_1$, $\alpha_2$, $\alpha_3$, $\alpha_4$ and speeds of rotation n1, n2, n3, n4, are changed toward the incremental transition steering angles $[\alpha_1, \alpha_2, \alpha_3, \alpha_4]_{\alpha n1+\Delta\alpha n}$ and incremental transition speeds of rotation $[n1, n2, n3, n4]_{\alpha n1+\Delta\alpha n}$, after the steering angles $\alpha_1$, $\alpha_2$, $\alpha_3$, $\alpha_4$ have reached the incremental transition steering angles $[\alpha_1, \alpha_2, \alpha_3, \alpha_4]_{\alpha n1+\Delta\alpha n}$, and steering angle conformance has been detected, incremental transition steering angles $[\alpha_1, \alpha_2, \alpha_3, \alpha_4]_{\alpha n1+2\Delta\alpha n}$ and incremental transition speeds of rotation $[n1, n2, n3, n4]_{\alpha n1+2\Delta\alpha n}$ corresponding to the steering command value $(\alpha_{n1}+2\Delta\alpha_n)$, which is the steering command value $(\alpha_{n1}+\Delta\alpha_n)$ to which an additional incremental steering command value $\Delta\alpha n$ has been added, are computed as values that satisfy said steering constraint condition equation; the steering angles $\alpha_1$, $\alpha_2$, $\alpha_3$, $\alpha_4$ and speeds of rotation n1, n2, n3, n4 are changed toward the incremental transition steering angles $[\alpha_1, \alpha_2, \alpha_3, \alpha_4]_{\alpha n1+2\Delta\alpha n}$ and incremental transition speeds of rotation $[n1, n2, n3, n4]_{\alpha n1=2\Delta\alpha n}$; from this point on, after steering angle conformance of steering angles $\alpha_1$, $\alpha_2$, $\alpha_3$, $\alpha_4$ has been detected, incremental transition steering angles $[\alpha_1, \alpha_2, \alpha_3, \alpha_4]_{\alpha n1+n\Delta\alpha n}$ and incremental transition speeds of rotation $[n1, n2, n3, n4]_{\alpha n1+n\Delta\alpha n}$, corresponding to the steering command value $(\alpha n_1+n\Delta\alpha n)$, which is the command value $\alpha n_1$ to which the incremental steering command value $\Delta\alpha n$ has been added [n times] in succession, are computed as values that satisfy said steering constraint condition equations; the steering angles $\alpha_1$, $\alpha_2$, $\alpha_3$, $\alpha_4$ and speeds of rotation n1, n2, n3, n4 are changed toward the incremental transition steering angles $[\alpha_1, \alpha_2, \alpha_3, \alpha_4]_{\alpha n1+n\Delta\alpha n}$; and incremental transition speeds of rotation $[n1, n2, n3, n4]_{\alpha n1+n\Delta\alpha n}$; arrival of the steering angles $\alpha_1$, $\alpha_2$, $\alpha_3$, $\alpha_4$ at the transition steering angles $[\alpha_1, \alpha_2, \alpha_3, \alpha_4]_{\alpha n1+n\Delta\alpha n}$ in steering angle conformance is detected; and the process is repeated until the steering angles $\alpha_1$, $\alpha_2$, $\alpha_3$, $\alpha_4$ have been changed from the steering angles $[\alpha_1, \alpha_2, \alpha_3, \alpha_4]_{\alpha n1}$ to the steering angles $[\alpha_1, \alpha_2, \alpha_3, \alpha_4]_{\alpha n2}$.

Then, with the steering command value defined as the angle $\alpha n$, the steering constraint condition equations for forming a prescribed steering mode M1 may be expressed as $$\alpha_1 = -\alpha_3 = \tan^{-1}\left(\frac{L}{x_n + \frac{y_n}{\tan\alpha_n} - W}\right)$$

$$\alpha_2 = -\alpha_4 = \tan^{-1}\left(\frac{L}{x_n + \frac{y_n}{\tan\alpha_n} + W}\right)$$

and $$n_1 : n_2 : n_3 : n_4 = \sqrt{\left(x_n + \frac{y_n}{\tan\alpha_n} - W\right)^2 + L^2} : \sqrt{\left(x_n + \frac{y_n}{\tan\alpha_n} + W\right)^2 + L^2} :$$
$$\sqrt{\left(x_n + \frac{y_n}{\tan\alpha_n} - W\right)^2 + L^2} : \sqrt{\left(x_n + \frac{y_n}{\tan\alpha_n} + W\right) + L^2}$$

and the steering constraint condition equations for forming a prescribed steering mode M3 are $$\alpha_1 = \tan^{-1}\left(\frac{2L}{x_n + \frac{L+y_n}{\tan\alpha_n} - W}\right)$$

$$\alpha_2 = \tan^{-1}\left(\frac{2L}{x_n + \frac{L+y_n}{\tan\alpha_n} + W}\right)$$

$$\alpha_3 = \alpha_4 = 0$$

-continued $$n_1:n_2:n_3:n_4 = \sqrt{\left(x_n + \frac{L+y_n}{\tan\alpha_n} - W\right)^2 + (2L)^2} :$$

$$\sqrt{\left(x_n + \frac{L+y_n}{\tan\alpha_n} + W\right)^2 + (2L)^2} : \left|x_n + \frac{L+y_n}{\tan\alpha_n} - W\right| : \left|x_n + \frac{L+y_n}{\tan\alpha_n} + W\right|$$

where $\alpha_1$, $\alpha_2$, $\alpha_3$, and $\alpha_4$ are the steering angles of the right front wheel, left front wheel, right rear wheel, and left rear wheel, respectively;

n1, n2, n3 and n4 are the speeds of rotation of the right front wheel, left front wheel, right rear wheel, and left rear wheel, respectively;

L is the distance between the wheels and a center line X between the front wheels and rear-wheels;

W is the distance between the wheels and a center line Y between the left wheels and right wheels;

$x_n$ and $y_n$ are the x and y coordinates of an arbitrary point on the vehicle, Pn; and $\alpha_n$ (the steering command value) is the angle formed between the center line Y between the left and right wheels of the vehicle, and the direction of travel of the point Pn.

Note that when there is no need to forcibly control the speeds of rotation n1, n2, n3, and n4 of the right front, left front, right rear and left rear wheels, respectively, the above equations related to n1, n2, n3 and n4 are not required.

Also, in the present invention, steering control of a four-wheel-independent-steering vehicle may be performed such that in steering control wherein, by changing how a steering command value is taken, for changing the direction of travel of a vehicle by separately controlling steering angles $\alpha_1$, $\alpha_2$, $\alpha_3$, $\alpha_4$ of the four wheels in accordance with steering constraint condition equations for forming a prescribed steering mode, an angle $\alpha_o$, the angle formed between a center line Y between the left and right wheels of the vehicle, and the direction of travel of a point Po, the center point on a line connecting the left and right front wheels, is used as a steering command value; in a process for changing the steering command value $\alpha_o$ from a value $\alpha_{o1}$ to a value $\alpha_{o2}$ for transitioning the steering angles $\alpha_1$, $\alpha_2$, $\alpha_3$, $\alpha_4$ from the values $[\alpha_1, \alpha_2, \alpha_3, \alpha_4]_{\alpha o1}$, which correspond to the command value $\alpha_{o1}$, to the values $[\alpha_1, \alpha_2, \alpha_3, \alpha_4]_{\alpha o2}$, which correspond to the command value $\alpha_{o2}$, incremental transition steering angles $[\alpha_1, \alpha_2, \alpha_3, \alpha_4]_{\alpha o1+\Delta\alpha o}$, corresponding to the steering command value ($\alpha_{o1}+\Delta\alpha_o$), which is the steering command value $\alpha_{o1}$ to which an incremental steering command value $\Delta\alpha_o$ has been added, are computed as values that satisfy said steering constraint condition equation; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha o1+\Delta\alpha o}$; after the steering angles $\alpha_1$, $\alpha_2$, $\alpha_3$, $\alpha_4$ have reached the incremental transition steering angles $[\alpha_1, \alpha_2, \alpha_3, \alpha_4]_{\alpha o1+\Delta\alpha o}$, and steering angle conformance has been detected, incremental transition steering angles $[\alpha_1, \alpha_2, \alpha_3, \alpha_4]_{\alpha o1+2\Delta\alpha o}$ corresponding to the steering command value ($\alpha_{o1}+2\Delta\alpha_o$), which is the steering command value ($\alpha_{o1}+\Delta\alpha_o$) to which an additional incremental steering command value $\Delta\alpha_o$ has been added, are computed as values that satisfy said steering constraint condition equation; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha o1+2\Delta\alpha o}$; from this point on, after steering angle conformance of steering angles $\alpha_1$, $\alpha_2$, $\alpha_3$, $\alpha_4$ has been detected, incremental transition steering angles $[\alpha_1, \alpha_2, \alpha_3, \alpha_4]_{\alpha o+n\Delta\alpha o}$ corresponding to the steering command value ($\alpha o_1+n\Delta\alpha o$), which is the steering command value $\alpha o1$ to which the incremental steering command value $\Delta\alpha o$ has been added [n times] in succession, are computed as values that satisfy said steering constraint condition equations; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha o1+n\Delta\alpha o}$; arrival of the steering angles $\alpha_1$, $\alpha_2$, $\alpha_3$, $\alpha_4$ at the transition steering angles $[\alpha_1, \alpha_2, \alpha_3, \alpha_4]_{\alpha o1+n\Delta\alpha o}$ in steering angle conformance is detected; and the process is repeated until the steering angles $\alpha_1$, $\alpha_2$, $\alpha_3$, $\alpha_4$ have been changed from the steering angles $[\alpha_1, \alpha_2, \alpha_3, \alpha_4]_{\alpha o1}$ to the steering angles $[\alpha_1, \alpha_2, \alpha_3, \alpha_4]_{\alpha o2}$.

Also, as an alternative, steering control of a four-wheel-independent-steering vehicle may be performed such that in steering control wherein, by changing how a steering command value is taken, for changing the direction of travel of a vehicle by separately controlling steering angles $\alpha_1$, $\alpha_2$, $\alpha_3$, $\alpha_4$ and speeds of rotation n1, n2, n3, n4 of the four wheels in accordance with steering constraint condition equations for forming a prescribed steering mode, an angle $\alpha_o$, the angle formed between a center line Y between the left and right wheels of the vehicle, and the direction of travel of a point Po, the center point on a line connecting the left and right front wheels, is used as a steering command value; in a process for changing the steering command value $\alpha_o$ from a value $\alpha_{o1}$ to a value $\alpha_{o2}$ for transitioning the steering angles $\alpha_1$, $\alpha_2$, $\alpha_3$, $\alpha_4$ from the values $[\alpha_1, \alpha_2, \alpha_3, \alpha_4]_{\alpha o1}$, which correspond to the command value $\alpha_{o1}$, to the values $[\alpha_1, \alpha_2, \alpha_3, \alpha_4]_{\alpha o2}$, which correspond to the command value $\alpha_{o2}$, incremental transition steering angles $[\alpha_1, \alpha_2, \alpha_3, \alpha_4]_{\alpha o1+\Delta\alpha o}$ and incremental speeds of rotation $[n1, n2, n3, n4]_{\alpha o1+\Delta\alpha o}$ corresponding to the steering command value ($\alpha_{o1}+\Delta\alpha_o$), which is the steering command value $\alpha_{o1}$ to which an incremental steering command value $\Delta\alpha_o$ has been added, are computed as values that satisfy said steering constraint condition equation; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha o1+\Delta\alpha o}$ and the incremental speeds of rotation n1, n2, n3, and n4 are changed toward the incremental transition speeds of rotation $[n1, n2, n3, n4]_{\alpha o1+\Delta\alpha o}$; after the steering angles $\alpha_1$, $\alpha_2$, $\alpha_3$, $\alpha_4$ have reached the incremental transition steering angles $[\alpha_1, \alpha_2, \alpha_3, \alpha_4]_{\alpha o1+\Delta\alpha o}$, and steering angle conformance has been detected, incremental transition steering angles $[\alpha_1, \alpha_2, \alpha_3, \alpha_4]_{\alpha o1+2\Delta\alpha o}$ and incremental transition speeds of rotation $[n1, n2, n3, n4]_{\alpha o1+2\Delta\alpha o}$ corresponding to the steering command value ($\alpha_{o1}+2\Delta\alpha_o$), which is the steering command value $\alpha_{o1}$ to which an additional incremental steering command value $\Delta\alpha_o$ has been added, are computed as values that satisfy said steering constraint condition equation; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha o1+2\Delta\alpha o}$ and the speeds of rotation n1, n2, n3, n4 are changed toward the incremental transition speeds of rotation $[n1, n2, n3, n4]_{\alpha 1+2\Delta\alpha o}$; from this point on, after steering angle conformance of steering angles $\alpha_1$, $\alpha_2$, $\alpha_3$, $\alpha_4$ has been detected, incremental transition steering angles $[\alpha_1, \alpha_2, \alpha_3, \alpha_4]_{\alpha o1+n\Delta\alpha o}$ and incremental transition speeds of rotation $[n1, n2, n3, n4]_{\alpha o1+n\Delta\alpha o}$ corresponding to the steering command value ($\alpha o_1+n\Delta\alpha o$), which is the steering command value $\alpha o_1$ to which the incremental steering command value $\Delta\alpha o$ has been added [n times] in succession, are computed as values that satisfy said steering constraint condition equations; the steering angles $\alpha_1$, $\alpha_2$, $\alpha_3$, $\alpha_4$ are changed toward the incremental transition steering angles $[\alpha_1, \alpha_2, \alpha_3, \alpha_4]_{\alpha o1+n\Delta\alpha o}$, the speeds of rotation n1, n2, n3, n4 are changed toward the incremental transition speeds of rotation

[n1, n2, n3, n4]$_{\alpha o1+\Delta\alpha o}$; arrival of the steering angles $\alpha_1$, $\alpha_2$, $\alpha_3$, $\alpha_4$ at the transition steering angles [$\alpha_1$, $\alpha_2$, $\alpha_3$, $\alpha_4$]$_{\alpha o1+n\Delta\alpha o}$ in steering angle conformance is detected; and the process is repeated until the steering angles $\alpha_1$, $\alpha_2$, $\alpha_3$, $\alpha_4$ have been changed from the steering angles [$\alpha_1$, $\alpha_2$, $\alpha_3$, $\alpha_4$]$_{\alpha o1}$ to the steering angles [$a_1$, $\alpha_2$, $\alpha_3$, $\alpha_4$]$_{\alpha o2}$.

Then, with the steering command value defined as the angle $\alpha_o$, the steering constraint condition equations for forming a prescribed steering mode M1 may be expressed as $$\alpha_1 = -\alpha_3 = \tan^{-1}\left(\frac{1}{\frac{l}{\tan\alpha_0} - \frac{W}{L}}\right)$$

$$\alpha_2 = -\alpha_4 = \tan^{-1}\left(\frac{1}{\frac{l}{\tan\alpha_0} + \frac{W}{L}}\right)$$

and $$n_1 : n_2 : n_3 : n_4 = \sqrt{\left(\frac{L}{\tan\alpha_0} - W\right)^2 + L^2} : \sqrt{\left(\frac{L}{\tan\alpha_0} + W\right)^2 + L^2} :$$

$$\sqrt{\left(\frac{L}{\tan\alpha_0} - W\right)^2 + L^2} : \sqrt{\left(\frac{L}{\tan\alpha_0} + W\right)^2 + L^2}$$

and the steering constraint condition equations for defining a prescribed steering mode M3 may be expressed as $$\alpha_1 = \tan^{-1}\left(\frac{1}{\frac{1}{\tan\alpha_0} - \frac{W}{2L}}\right)$$

$$\alpha_2 = \tan^{-1}\left(\frac{1}{\frac{1}{\tan\alpha_0} + \frac{W}{2L}}\right)$$

$$\alpha_3 = \alpha_4 = 0$$

and $$n_1 : n_2 : n_3 : n_4 = \sqrt{\left(\frac{2L}{\tan\alpha_0} - W\right)^2 + (2L)^2} : \sqrt{\left(\frac{2L}{\tan\alpha_0} + W\right)^2 + (2L)^2} :$$

$$\left|\frac{2L}{\tan\alpha_0} - W\right| : \left|\frac{2L}{\tan\alpha_0} + W\right|$$

where $\alpha_1$, $\alpha_2$, $\alpha_3$, and $\alpha_4$ are the steering angles of the right front wheel, left front wheel, right rear wheel, and left rear wheel, respectively;

n1, n2, n3, and n4 are the speeds of rotation of the right front wheel, left front wheel, right rear wheel, and left rear wheel, respectively;

L is the distance between the wheels and a center line X between the front wheels and rear wheels;

W is the distance between the wheels and a center line Y between the left wheels and right wheels; and $\alpha_o$ (the steering command value), is the angle formed between the center line Y between the left and right wheels of the vehicle and the direction of travel of the point Po, which is the center point on a line connecting the left and right front wheels.

Note that when there is no need to forcibly control the speeds of rotation n1, n2, n3 and n4 of the right front, left front, right rear and left rear wheels, respectively, the above equations related to n1, n2, n3 and n4 are not required.

In addition, in the present invention, in order to prevent collisions from occurring when the vehicle is started into motion from a stopped state, or when the steering mode is changed, and to ensure that the vehicle moves off smoothly and accurately in the desired direction, operating in the prescribed steering mode, when a change is made from one to another of a plurality of steering modes including the forward and reverse modes of the vehicle, the steering angles of the wheels, $\alpha_1$, $\alpha_2$, $\alpha_3$, $\alpha_4$, are first momentarily reset to the 0-degree straight ahead value ($\alpha_1=\alpha_2=\alpha_3=\alpha_4=0$) before separately changing the steering angles $\alpha_1$, $\alpha_2$, $\alpha_3$, $\alpha_4$ to conform to the steering constraint condition equations for the prescribed mode.

Also, when a change is made to select a desired steering mode from a plurality of prescribed modes including the forward and reverse modes of the vehicle, the vehicle is driven in motion only after the steering angles of the wheels, $\alpha_1$, $\alpha_2$, $\alpha_3$, $\alpha_4$, are in conformance with the steering constraint condition equations for the newly selected prescribed steering mode.

BRIEF DESCRIPTION OF THE SEVERAL VIEWS OF THE DRAWING

These and other features, aspects, and advantages of the present invention will become apparent with reference to the following description, claims, and accompanying drawings, where

DETAILED DESCRIPTION

Figure 1:
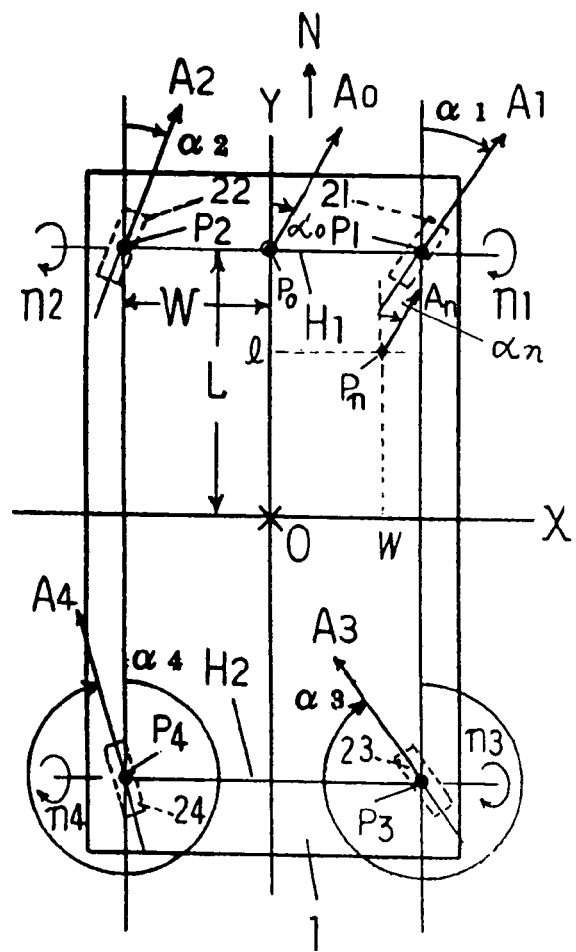
FIG. 1 is a plan view showing the basic configuration of the body base of an electric vehicle according to the present invention.

The best mode for carrying out the present invention is described in detail below, with reference to the attached drawings. One basic mode for carrying out the present invention is a four-wheel-independent-steering-vehicle steering control method that constitutes steering control wherein, by changing a steering command value, for changing the direction of travel of a vehicle by separately controlling steering angles $\alpha_1$, $\alpha_2$, $\alpha_3$, $\alpha_4$ of the four wheels in accordance with steering constraint condition equations for forming a prescribed steering mode, one of the variables of the steering constraint condition equation is used as a steering command value S; in a process for changing the steering command value S from a value $S_1$ to a value $S_2$ for transitioning the steering angles $\alpha_1$, $\alpha_2$, $\alpha_3$, $\alpha_4$ from the values $[\alpha_1, \alpha_2, \alpha_3, \alpha_4]_{S1}$, which correspond to the command value $S_1$, to the values $[\alpha_1, \alpha_2, \alpha_3, \alpha_4]_{S2}$, which correspond to the command value $S_2$, incremental transition steering angles $[\alpha_1, \alpha_2, \alpha_3, \alpha_4]_{S1+\Delta S}$ corresponding to the steering command value $(S_1+\Delta S)$, which is the steering command value $S_1$ to which an incremental steering command value $\Delta S$ has been added, are computed as values that satisfy said steering constraint condition equation;

the steering angles $\alpha_1$, $\alpha_2$, $\alpha_3$, $\alpha_4$ are changed toward the incremental transition steering angles $[\alpha_1, \alpha_2, \alpha_3, \alpha_4]_{S1+\Delta S}$;

after the steering angles $\alpha_1$, $\alpha_2$, $\alpha_3$, $\alpha_4$ have reached the incremental transition steering angles $[\alpha_1, \alpha_2, \alpha_3, \alpha_4]_{S1+\Delta S}$, and steering angle conformance has been detected, incremental transition steering angles $[\alpha_1, \alpha_2, \alpha_3, \alpha_4]_{S1+2\Delta S}$ corresponding to the steering command value $(S_1+2\Delta S)$, which is the steering command value $S_1$ to which an additional incremental steering command value $\Delta S$ has been added, are computed as values that satisfy said steering constraint condition equation;

the steering angles $\alpha_1$, $\alpha_2$, $\alpha_3$, $\alpha_4$ are changed toward the incremental transition steering angles $[\alpha_1, \alpha_2, \alpha_3, \alpha_4]_{S1+2\Delta S}$;

from this point on, after steering angle conformance of the steering angles $\alpha_1$, $\alpha_2$, $\alpha_3$, $\alpha_4$ has been detected, incremental transition steering angles $[\alpha_1, \alpha_2, \alpha_3, \alpha_4]_{S1+n\Delta S}$ corresponding to the steering command value $(S_1+n\Delta S)$, which is the steering command value $S_1$ to which the incremental steering command value $\Delta S$ has been added [n times] in succession, are computed as values that satisfy said steering constraint condition equations; the steering angles $\alpha_1$, $\alpha_2$, $\alpha_3$, $\alpha_4$ are changed toward the incremental transition steering angles $[\alpha_1, \alpha_2, \alpha_3, \alpha_4]_{S1+n\Delta S}$; arrival of the steering angles at, $\alpha_2$, $\alpha_3$, $\alpha_4$ at the incremental transition steering angles $[a_1, \alpha_2, \alpha_3, \alpha_4]_{S1+n\Delta S}$ in steering angle conformance is detected; and the process is repeated until the steering angles $\alpha_1$, $\alpha_2$, $\alpha_3$, $\alpha_4$ have been changed from the steering angles $[\alpha_1, \alpha_2, \alpha_3, \alpha_4]_{S1}$ to the steering angles $[\alpha_1, \alpha_2, \alpha_3, \alpha_4]_{S2}$.

Another basic mode for carrying out the present invention is a four-wheel-independent-steering-vehicle steering control method that constitutes steering control wherein, by changing how a steering command value is taken for changing the direction of travel of a vehicle by separately controlling steering angles $\alpha_1$, $\alpha_2$, $\alpha_3$, $\alpha_4$ and speeds of rotation n1, n2, n3, n4 of the four wheels in accordance with steering constraint condition equations for forming a prescribed steering mode, one of the variables of the steering constraint condition equation is used as a steering command value S, in a process for changing the steering command value S from a value $S_1$ to a value $S_2$ for transitioning the steering angles at, $\alpha_2$, $\alpha_3$, $\alpha_4$ from the values $[\alpha_1, \alpha_2, \alpha_3, \alpha_4]_{S1}$, which correspond to the command value $S_1$, to the values $[\alpha_1, \alpha_2, \alpha_3, \alpha_4]_{S2}$, which correspond to the command value $S_2$, incremental transition steering angles $[\alpha_1, \alpha_2, \alpha_3, \alpha_4]_{S1+\Delta S}$ and incremental transition speeds of rotation $[n1, n2, n3, n4]_{S1+\Delta S}$ corresponding to the steering command value $(S_1+\Delta S)$, which is the steering command value $S_1$ to which an incremental steering command value $\Delta S$ has been added, are computed as values that satisfy said steering constraint condition equations;

the steering angles $\alpha_1$, $\alpha_2$, $\alpha_3$, $\alpha_4$ and speeds of rotation n1, n2, n3, n4 are changed toward the incremental transition steering angles $[\alpha_1, \alpha_2, \alpha_3, \alpha_4]_{S1+\Delta S}$ and speeds of rotation $[n1, n2, n3, n4]_{S1+\Delta S}$;

after the steering angles $\alpha_1$, $\alpha_2$, $\alpha_3$, $\alpha_4$ have reached the incremental transition steering angles $[\alpha_1, \alpha_2, \alpha_3, \alpha_4]_{S1+\Delta S}$, and steering angle conformance has been detected, incremental transition steering angles $[\alpha_1, \alpha_2, \alpha_3, \alpha_4]_{S1+2\Delta S}$ and incremental transition speeds of rotation $[n1, n2, n3, n4]_{S1+2\Delta S}$ corresponding to the steering command value $(S_1+2\Delta S)$, which is the steering command value $S_1$ to which an additional incremental steering command value $\Delta S$ has been added, are computed as values that satisfy said steering constraint condition equations;

the steering angles $\alpha_1$, $\alpha_2$, $\alpha_3$, $\alpha_4$ and speeds of rotation n1, n2, n3, n4 are changed toward the incremental transition steering angles $[\alpha_1, \alpha_2, \alpha_3, \alpha_4]_{S1+2\Delta S}$ and incremental transition speeds of rotation $[n1, n2, n3, n4]_{S1+2\Delta S}$;

from this point on, after steering angle conformance of the steering angles $\alpha_1$, $\alpha_2$, $\alpha_3$, $\alpha_4$ is detected, incremental transition steering angles $[\alpha_1, \alpha_2, \alpha_3, \alpha_4]_{S1+n\Delta S}$ and incremental transition speeds of rotation $[n1, n2, n3, n4]_{S1+n\Delta S}$ corresponding to the steering command value $(S_1+n\Delta S)$, which is the steering command value $S_1$ to which the incremental steering command value $\Delta S$ has been added [n times] in succession, are computed as values that satisfy said steering constraint condition equations; the steering angles $\alpha_1$, $\alpha_2$, $\alpha_3$, $\alpha_4$ and speeds of rotation n1, n2, n3, n4 are changed toward the incremental transition steering angles $[\alpha_1, \alpha_2, \alpha_3, \alpha_4]_{S1+n\Delta S}$ and incremental transition speeds of rotation $[n1, n2, n3, n4]_{S1+n\Delta S}$; arrival of the steering angles $\alpha_1$, $\alpha_2$, $\alpha_3$, $\alpha_4$ at the transition steering angles $[\alpha_1, \alpha_2, \alpha_3, \alpha_4]_{S1+n\Delta S}$ in steering angle conformance is detected; and the process is repeated until the steering angles $\alpha_1$, $\alpha_2$, $\alpha_3$, $\alpha_4$ have been changed from the steering angles $[\alpha_1, \alpha_2, \alpha_3, \alpha_4]_{S1}$ to the steering angles $[\alpha_1, \alpha_2, \alpha_3, \alpha_4]_{S2}$.

Figure 2:
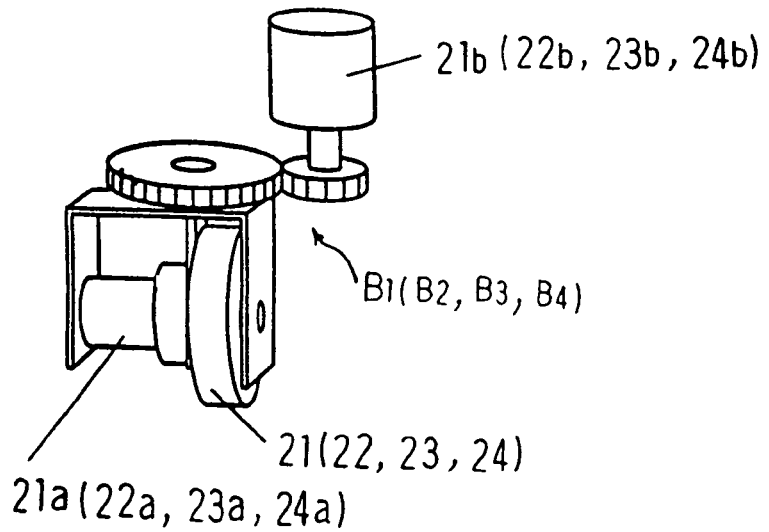
FIG. 2 is an oblique view of a wheel drive/steering block installed on the body base of FIG. 1.

In the following paragraphs, the present invention will be described with reference to drawings showing an embodiment thereof. FIG. 1 is a plan view showing the basic configuration of the body base of the electric vehicle [in an embodiment] of the present invention. FIG. 2 is an oblique view of a steering/drive block installed on the body base of FIG. 1. Shown in FIG. 1 are an electric vehicle body base 1; points P1 and P2, which indicate the locations at which the two front wheels, right and left, respectively, are installed on the under-surface of the base body 1; and points P3 and P4, which indicate the positions at which the two rear wheels, right and left, respectively, are installed on the under surface of the base body 1. Also shown are a right front wheel 21, a left front wheel 22, a right rear wheel 23, and a left rear wheel 24. An arrow N indicates the straight-forward direction of travel of the vehicle. Points P1, P2, P3; and P4 (the locations of the wheels 21, 22, 23, and 24) lie at the intersections of the sides of a rectangle having a center point O, i.e., the center relative to the points P1, P2, P3, and P4. It will be assumed, for the purposes of this description, that an X axis and a Y axis passing through the center point O are orthogonal coordinate axes. The X axis forms a center line between the front wheels 21 and 22, and rear wheels 23 and 24, thus constituting a center line in the left-right direction-of the vehicle; and the Y axis forms a center line between the right wheels 21 and 23 and left wheels 22 and 24, thus constituting a center line in the front-rear direction of the vehicle. Also, the Y axis lies in the direction of straight forward travel of the vehicle, which is the direction indicated by the arrow N. The points P1 and P2 are connected by a front wheel axis line H1, which is the equivalent of a virtual axle for the front wheels 21 and 22. The points P3 and P4 are connected by a rear wheel axis line H2, which is the equivalent of a virtual axle for the rear wheels 23 and 24. A distance L is the distance between the X axis and the points P1, P2, P3, and P4; and a distance W is the distance between the Y axis and the points P1, P2, P3, and P4. A point Po marks the center of a line connecting P1 (the location of the right front wheel) with P2 (the location of the left front wheel). Pn marks an arbitrary point on the body base 1 that could mark, for example, the location at which a vehicle driver would stand, the position of which is indicated in orthogonal coordinates of the X and Y axes (in the form $x_n, y_n$). $A_o$ indicates the direction in which the point Po moves along with the motion of the vehicle, and $\alpha_o$ is the angle formed between $A_o$ (direction of Po motion) and the vehicle center line Y (i.e., the angular direction of motion of the center point Po as the vehicle is steered). $A_n$ indicates the direction in which the point Pn moves along with the motion of the vehicle, and $\alpha_n$ is the angle formed between $\alpha_n$ (direction of Pn motion) and the vehicle center line Y (i.e., $\alpha_n$ is the angular direction of motion of the point Pn as the vehicle is steered).

The speeds of rotation of the right front wheel 21, the left front wheel 22, the right rear wheel 23 and the left rear wheel 24 are represented by n1, n2, n3, and n4, respectively; and the steering angles of the right front wheel 21, the left front wheel 22, the right rear wheel 23 and the left rear wheel 24, when the vehicle is under steering control, are represented by $\alpha_1$, $\alpha_2$, $\alpha_3$, and $\alpha_4$, respectively. Also, the pointing directions (directions of travel) of the right front wheel 21, the left front wheel 22, the right rear wheel 23 and the left rear wheel 24, when the vehicle is under steering control, are represented by A1, A2, A3, and A4, respectively.

When the vehicle is under steering control, each individual rotation speed n1, n2, n3, n4 and steering angle $\alpha_1$, $\alpha_2$, $\alpha_3$, $\alpha_4$ of the wheels 21, 22, 23, 24, is separately and independently controlled. To accomplish this, each of the wheels 21–24 is provided a separate steering/drive block, designated B1, B2, B3, and B4, respectively. As shown in FIG. 2, each drive block comprises a drive motor (21a, 22a, 23a, 24a) for controlling speed of rotation, and a steering motor (21b, 22b, 23b, 24b) for controlling steering angle, with both motors appropriately coupled to their respective wheels of the vehicle. When the vehicle is under driving control, the actual direction of travel (the actual steering angle) of each of the wheels 21, 22, 23, 24 is sensed by a steering angle sensor, a sense signal of which is fed-back to the control system for effecting steering control for maintaining the corresponding steering angles $\alpha_1$, $\alpha_2$, $\alpha_3$, $\alpha_4$ in accordance with the steering command values set by the driver. Also, steering modes M1, M2, M3, M4, and M5 are prepared for the above vehicle, and a computation means (computer) with computation programs for computing the steering angles and rotation speeds for each wheel, as required for generating each of the modes, is incorporated into the electric vehicle. The drive motors used for the wheels may be d.c. motors, synchronous motors, or induction motors. If four series-connected d.c. motors with identical specifications are used for the drive motors, however, the four motors will operate together as a complementary electrical circuit, and (barring wheel spinning) the ratios of the n1, n2, n3, n4 rotation speeds will automatically conform to the applicable constraint condition equations, thus eliminating the need to independently control individual motors.

Figure 3:
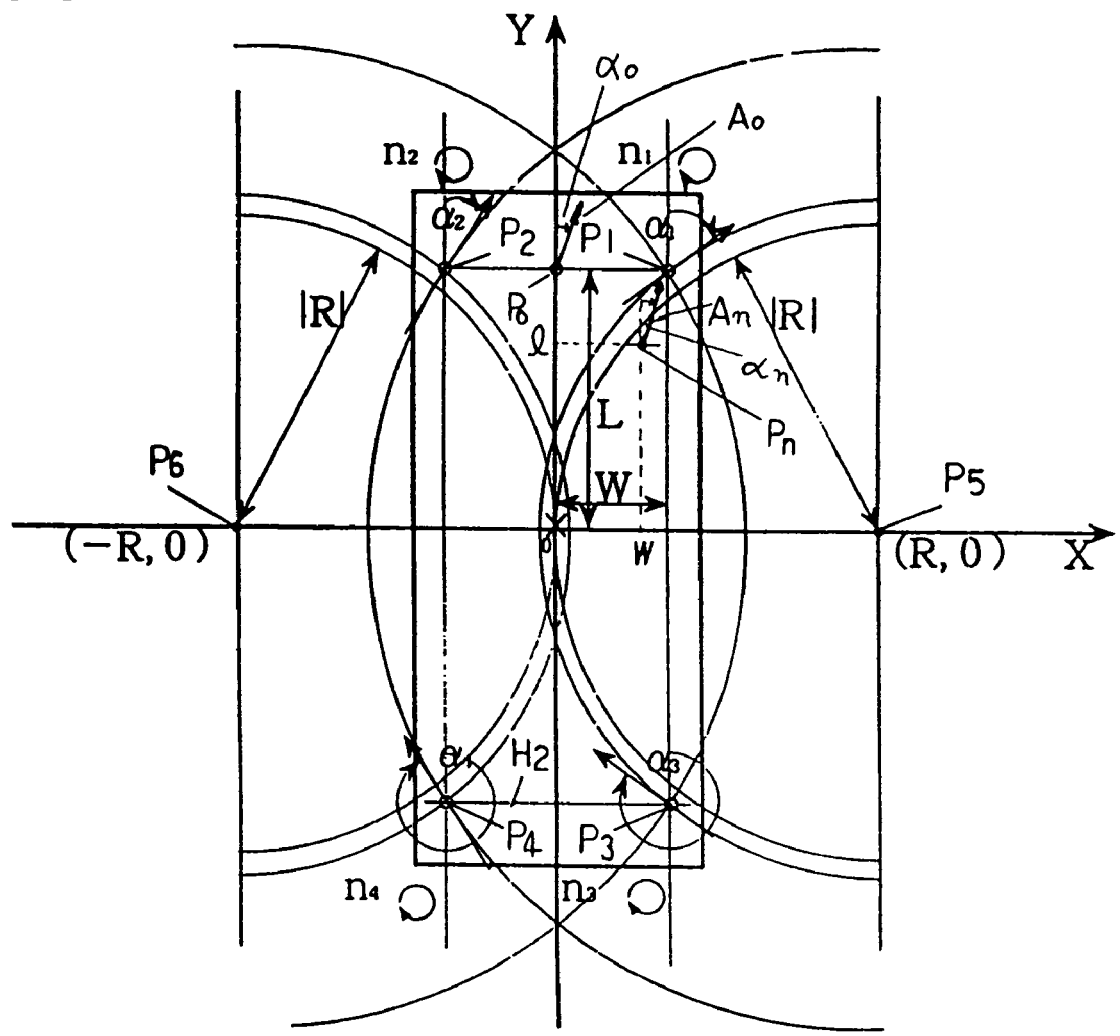
FIG. 3 is a drawing for explaining steering mode M1.

The steering mode M1, as shown in FIG. 3, is a mode such that the front wheel steering angles $\alpha_1$ and $\alpha_2$ and the rear wheel steering angles $\alpha_3$ and $\alpha_4$ are set to opposite left/right directions relative to the direction in which the vehicle is traveling, thus causing the wheel travel paths of the left and right rear wheels to follow in the travel paths of the left and right front wheels. In FIG. 3, a point P5 (at x, y coordinates R,0) indicates the center-of-turn when the vehicle is making a right (clockwise) turn; and a point P6 (at x, y coordinates –R, 0) indicates the center-of-turn when the vehicle is making a left (counter-clockwise) turn. In steering mode M1, as shown in FIG. 3, during a turn, the travel paths of the wheels 21–24 describe concentric arcs, with the points P5 and P6 at the centers of the concentric arcs. Moreover, as will become apparent upon further study of FIG. 3, to operate in steering mode M1 for steering angles $\alpha_1$ and $\alpha_2$ under conditions as listed in Table 1, the steering angles $\alpha_1$, $\alpha_2$, $\alpha_3$, $\alpha_4$ and rotation speeds n1, n2, n3, n4 of the wheels 21, 22, 23, 24, respectively, must satisfy the steering constraint condition equations (Eq.11), (E12), and (Eq.13).

TABLE 1

| | Steering Angle | |
|---|---|---|
| Condition | $\alpha_1$ | $\alpha_2$ |
| W ≦ \|R\| | $-\frac{\pi}{2} < \alpha_1 \leq \frac{\pi}{2}$ | $-\frac{\pi}{2} \leq \alpha_2 < \frac{\pi}{2}$ |
| 0 ≦ R < W (CW) | $\frac{\pi}{2} < \alpha_1 < \pi$ | $0 < \alpha_2 < \frac{\pi}{2}$ |
| –W < R ≦ 0 (CCW) | $-\frac{\pi}{2} < \alpha_1 < 0$ | $-\pi < \alpha_2 < -\frac{\pi}{2}$ |

$$\alpha_1 = -\alpha_3 = \tan^{-1}\left(\frac{L}{R-W}\right) \quad (E11)$$

$$\alpha_2 = -\alpha_4 = \tan^{-1}\left(\frac{L}{R+W}\right) \quad (E12)$$

$$n_1 : n_2 : n_3 : n_4 = \sqrt{(R-W)^2 + L^2} : \sqrt{(R+W)^2 + L^2} : \quad (E13)$$
$$\sqrt{(R-W)^2 + L^2} : \sqrt{(R+W)^2 + L^2}$$

Figure 4:
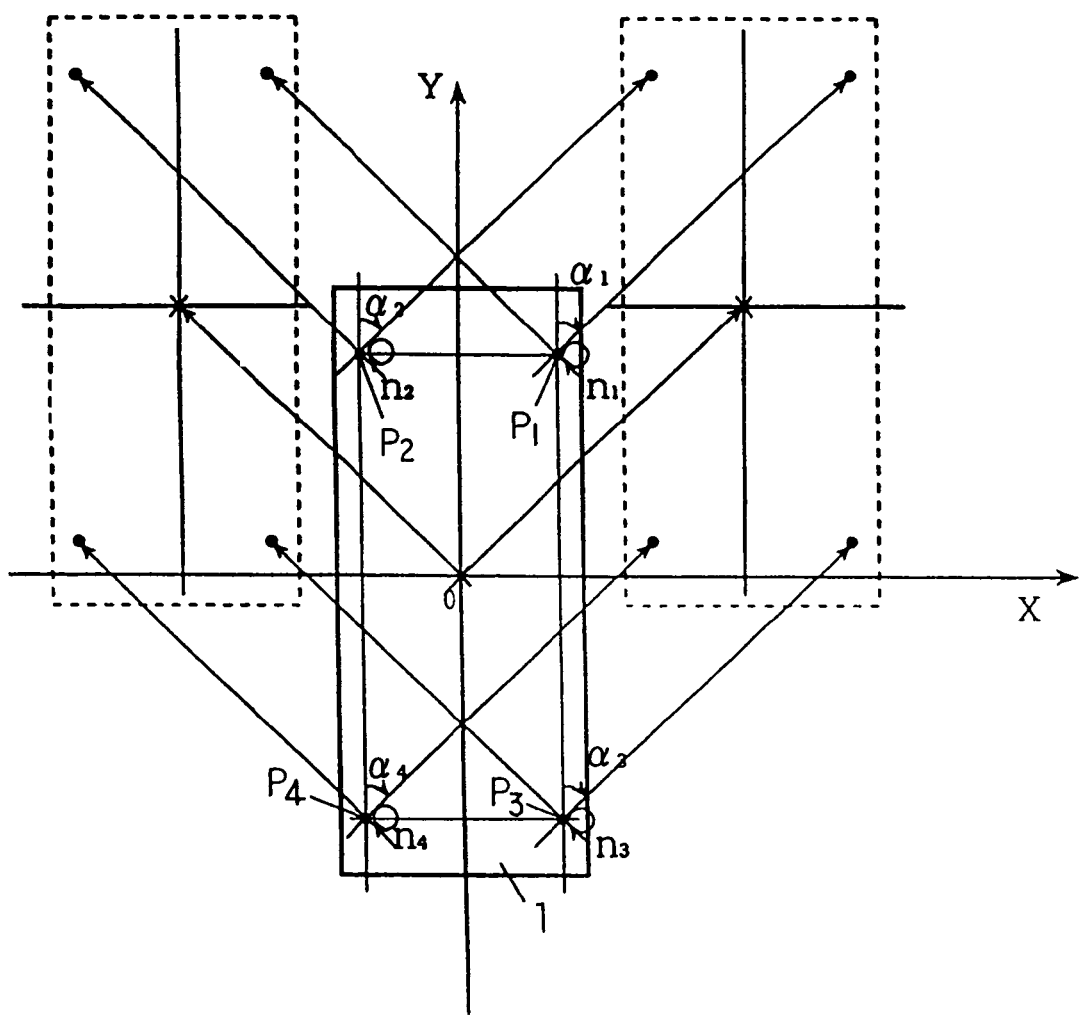
FIG. 4 is a drawing for explaining steering mode M2.

In steering mode M2, as shown in FIG. 4, the front wheel steering angles $\alpha_1$, and $\alpha_2$, and rear wheel steering angles $\alpha_3$, and $\alpha_4$, are all set to the same direction and same angle, thus producing a travel path pattern in which the travel paths of the rear wheels run parallel to the travel paths of the front wheels, thus causing the vehicle to perform an oblique parallel move to the right or left. As is apparent from FIG. 4, to drive the vehicle in steering mode M2, the respective steering angles $\alpha_1$, $\alpha_2$, $\alpha_3$, $\alpha_4$, and wheel rotation speeds n1, n2, n3, n4 must satisfy the condition equations (E21) and (E22):

$$\alpha_1 = \alpha_2 = \alpha_3 = \alpha_4 \quad (E21)$$

$$n_1 = n_2 = n_3 = n_4 \quad (E22)$$

Figure 5:
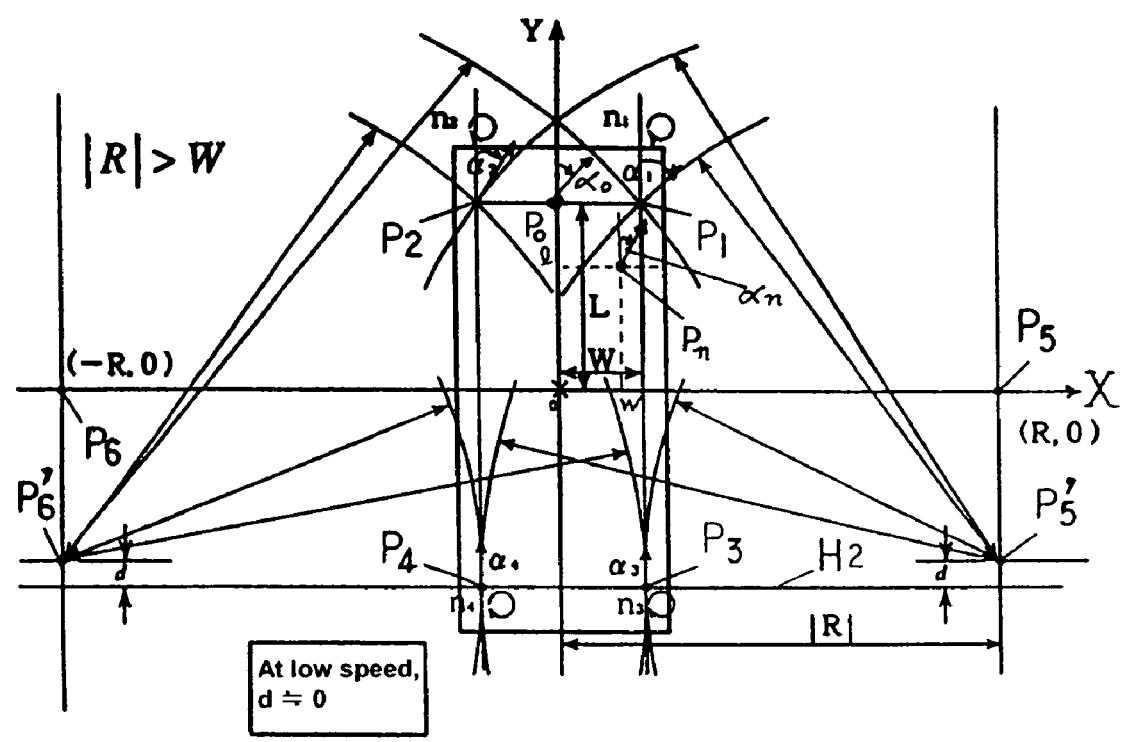
FIG. 5 is a drawing for explaining steering mode M3.

Steering mode M3, as shown in FIG. 5, is a mode in which only the front wheels (steering angles $\alpha_1$ and $\alpha_2$) are steered, as is the case in a conventional automobile. The travel paths of the front and rear wheels therefore describe an inside wheel difference pattern therebetween. As is apparent from FIG. 5, to operate in steering mode M3, the steering angles $\alpha_1$, $\alpha_2$, $\alpha_3$, $\alpha_4$ and rotation speeds n1, n2, n3, n4 of the wheels must satisfy the condition equations (E31), (E32), (E33), (E34). Also, as shown in FIG. 5, the right turn center point P5' and left turn center point P6' are both separated from the rear wheel axis line H2 by a distance d. At low vehicle speeds, it may be assumed that d≈0.

$$\alpha_1 = \tan^{-1}\left(\frac{2L}{R-W}\right) \tag{E31}$$

$$\alpha_2 = \tan^{-1}\left(\frac{2L}{R+W}\right) \tag{E32}$$

$$\alpha_3, \alpha_4 = 0 \tag{E33}$$

$$n_1:n_2:n_3:n_4 = \sqrt{(R-W)^2+(2L)^2}: \sqrt{(R+W)^2+(2L)^2}:|R-W|:|R+W| \tag{E34}$$

where $$-\frac{\pi}{2} < \alpha_1 < \frac{\pi}{2},$$

$$-\frac{\pi}{2} < \alpha_2 < \frac{\pi}{2}, \text{ and}$$

$$W < |R|,$$

and where it is assumed that d=0 because the vehicle is operated at low speed.

Figure 6:
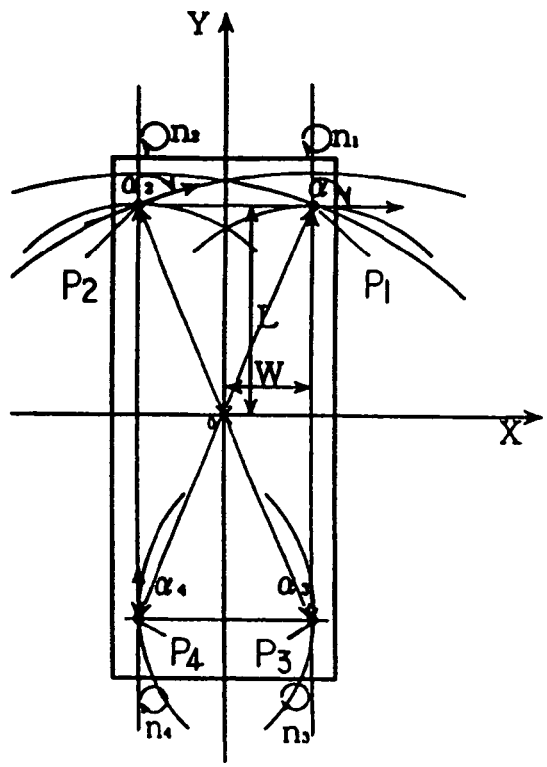
FIG. 6 is a drawing for explaining steering mode M4.

Steering mode M4, as shown in FIG. 6, is a mode in which the vehicle makes right (clockwise) turns with the right rear wheel point P3 as center-of-turn, and makes left (counter-clockwise) turns with the left rear wheel point P4 as center-of-turn. As is apparent from FIG. 6, to operate in steering mode M4, the steering angles $\alpha_1$, $\alpha_2$, $\alpha_3$, $\alpha_4$ and rotation speeds n1, n2, n3, n4 of the wheels must satisfy and support the condition equations (E41), (E42), (E43), (E44), (E45), (E46), (E47), and (E48).

When the vehicle is turned clockwise, with the right rear wheel point P3 as center-of-turn, $$\alpha_1 = \frac{\pi}{2} \tag{E41}$$

$$\alpha_2 = \tan^{-1}\left(\frac{L}{W}\right) \tag{E42}$$

$$\alpha_3 = \alpha_4 = 0 \tag{E43}$$

$$n_1:n_2:n_3:n_4 = L:\sqrt{W^2+L^2}:0:W \tag{E44}$$

Where $$0 < \alpha_2 < \frac{\pi}{2}$$

When the vehicle is turned counter-clockwise, with the left rear wheel point P4 as center-of-turn, $$\alpha_1 = \tan^{-1}\left(-\frac{L}{W}\right) \tag{E45}$$

$$\alpha_2 = -\frac{\pi}{2} \tag{E46}$$

$$\alpha_3 = \alpha_4 = 0 \tag{E47}$$

$$n_1:n_2:n_3:n_4 = \sqrt{W^2+L^2}:L:W:0 \tag{E48}$$

where $$-\frac{\pi}{2} < \alpha_4 < 0$$

Figure 7:
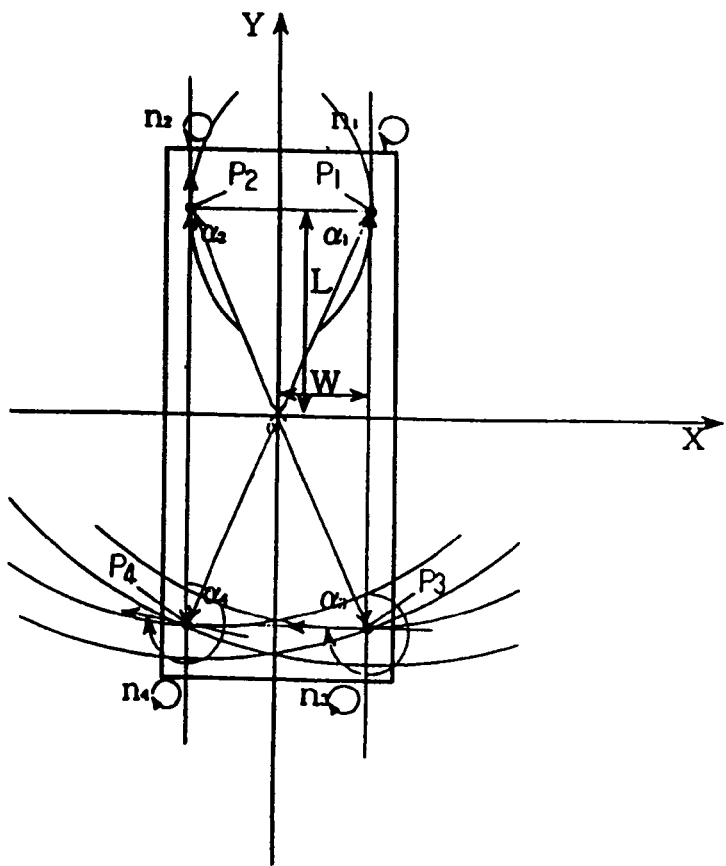
FIG. 7 is a drawing for explaining steering mode M5.

Steering mode M5, as shown in FIG. 7, is a mode in which the vehicle makes right (clockwise) turns with the right front wheel, point P1, as the center-of-turn, and makes left (counter-clockwise) turns with the left front wheel, point P2, as the center-of-turn. As is apparent from FIG. 7, to operate in steering mode M5, the steering angles $\alpha_1$, $\alpha_2$, $\alpha_3$, $\alpha_4$, and rotation speeds n1, n2, n3, n4 of the wheels must satisfy the condition equations (E51), (E52), (E53), (E54), (E55), (E56), (E57), and (E58).

When the vehicle is turned clockwise, with the right front wheel point P1 as center-of-turn, $$\alpha_1 = \alpha_2 = 0 \tag{E51}$$

$$\alpha_3 = -\frac{\pi}{2} \tag{E52}$$

$$\alpha_4 = \tan^{-1}\left(-\frac{L}{W}\right) \tag{E53}$$

$$n_1:n_2:n_3:n_4 = 0:W:L:\sqrt{W^2+L^2} \tag{E54}$$

where $$-\frac{\pi}{2} < \alpha_4 < 0$$

When the vehicle is turned counter-clockwise, with the left front wheel point P2 as center-of-turn, $$\alpha_1 = \alpha_2 = 0 \tag{E55}$$

$$\alpha_3 = \tan^{-1}\left(\frac{L}{W}\right) \tag{E56}$$

$$\alpha_4 = \frac{\pi}{2} \tag{E57}$$

$$n_1:n_2:n_3:n_4 = W:0:\sqrt{W^2+L^2}:L \tag{E58}$$

where $$0 < \alpha_3 < \frac{\pi}{2}$$

Because the separate paths traveled by the four wheels in the modes M1, M2, M3, M4 and M5 are not the same, the wheels must be driven at different rotation speeds according to the arc lengths of the paths they travel. Also, the steering angles $\alpha_1$, $\alpha_2$, $\alpha_3$, $\alpha_4$ and rotation speeds n1, n2, n3, n4 of the wheels must be controlled [not only during turns, but] also during steering transitions and after steering has ended (with commands to control the speed and direction of the vehicle) such as to satisfy the conditions of the condition equations (E11) through (E58), as determined by the steering mode. Failure to satisfy these conditions will cause wheel spinning and skidding, and toe-in/out between left and right wheels.

Accordingly, provided in the vehicle is a wheel steering angle computation means containing in its memory a computation program for computing wheel steering angles $\alpha_1$, $\alpha_2$, $\alpha_3$, $\alpha_4$, based on steering constraint condition equations required for steering in steering mode M1 (E11 and E12);

a computation program for computing wheel steering angles $\alpha_1$, $\alpha_2$, $\alpha_3$, $\alpha_4$, based on the steering constraint condition equation required for steering in steering mode M2 (E21);

a computation program for computing wheel steering angles $\alpha_1$, $\alpha_2$, $\alpha_3$, $\alpha_4$, based on steering constraint condition equations required for steering in steering mode M3 (E31, E32, and E33);

a computation program for computing wheel steering angles $\alpha_1$, $\alpha_2$, $\alpha_3$, $\alpha_4$, based on steering constraint condition equations required for steering in steering mode M4 (E41, E42, E43, E45, E46, and E47); and a computation program for computing wheel steering angles $\alpha_1$, $\alpha_2$, $\alpha_3$, $\alpha_4$ based on steering constraint condition equations required for steering in steering mode M5 (E51, E52, E53, E55, E56, and E57).

Also provided in the vehicle is a wheel rotation speed computation means containing in its memory a computation program for computing wheel rotation speeds n1, n2, n3, n4, based on the steering constraint condition equation required for steering in steering mode M1 (E13);

a computation program for computing wheel rotation speeds n1, n2, n3, n4, based on the steering constraint condition equation required for steering in steering mode M2 (E22);

a computation program for computing wheel rotation speeds n1, n2, n3, n4, based on the steering constraint condition equation required for steering in steering mode M3 (E34);

a computation program for computing wheel rotation speeds n1, n2, n3, n4 based on steering constraint condition equations required for steering in steering mode M4 (E44 and E48); and a computation program for computing wheel rotation speeds n1, n2, n3, n4, based on steering constraint condition equations required for steering in steering mode M5 (E55 and E58).

In the present invention, the steering process of a four-wheel-independent steering vehicle is controlled while the vehicle is moving, such that steering constraint condition equations as described above will always be satisfied, and the occurrence of wheel toe-in/out phenomena will be prevented. To accomplish this 'steering command values' for setting and changing the steering angles ($\alpha_1$, $\alpha_2$, $\alpha_3$, $\alpha_4$) of the wheels must be considered.

For example, in steering mode M1, as mentioned above, the steering angles $\alpha_1$, $\alpha_2$, $\alpha_3$, and $\alpha_4$ are determined by the equations E11 and E12:

$$\alpha_1 = -\alpha_3 = \tan^{-1}\left(\frac{L}{R-W}\right) \quad (11)$$

$$\alpha_2 = -\alpha_4 = \tan^{-1}\left(\frac{L}{R+W}\right) \quad (12)$$

Here, there are five variables, at, $\alpha_2$, $\alpha_3$, $\alpha_4$ and R, and since they exist in four equations, if one of the variables is determined the others can easily be found. And since the distances L and W are determined by the vehicle design, the steering angles ad, $\alpha_2$, $\alpha_3$, and $\alpha_4$ can easily be determined by determining the value of R. Therefore, the distance R (the vehicle turning radius) was used as the 'steering command value.'

For another example, in steering mode M3, as mentioned above, the steering angles $\alpha_1$, $\alpha_2$, $\alpha_3$, and $\alpha_4$ are determined by equations the E31, E32, and E33:

$$\alpha_1 = \tan^{-1}\left(\frac{2L}{R-W}\right) \quad (E31)$$

$$\alpha_2 = \tan^{-1}\left(\frac{2L}{R+W}\right) \quad (E32)$$

$$\alpha_3 = \alpha_4 = 0 \quad (E33)$$

Here there are three variables, $\alpha_1$, $\alpha_2$ and R that exist in two equations, thus if one of the three variables is known, the others can easily be found. And since the distances L and W are determined by the vehicle design, the steering angles $\alpha_1$, $\alpha_2$, $\alpha_3$, and $\alpha_4$ can easily be determined by determining the value of R. Therefore, the distance R (the vehicle turning radius) was used as the 'steering command value.'

Figure 8:
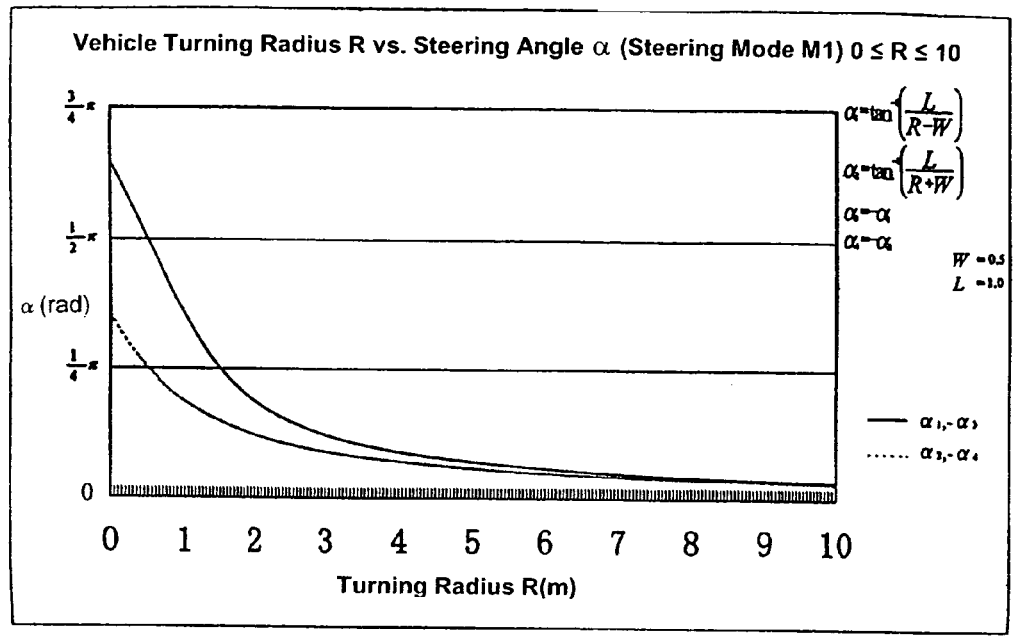
FIG. 8 is a graph showing the relationship between vehicle turning radius and steering angle in steering mode M1.
Figure 9:
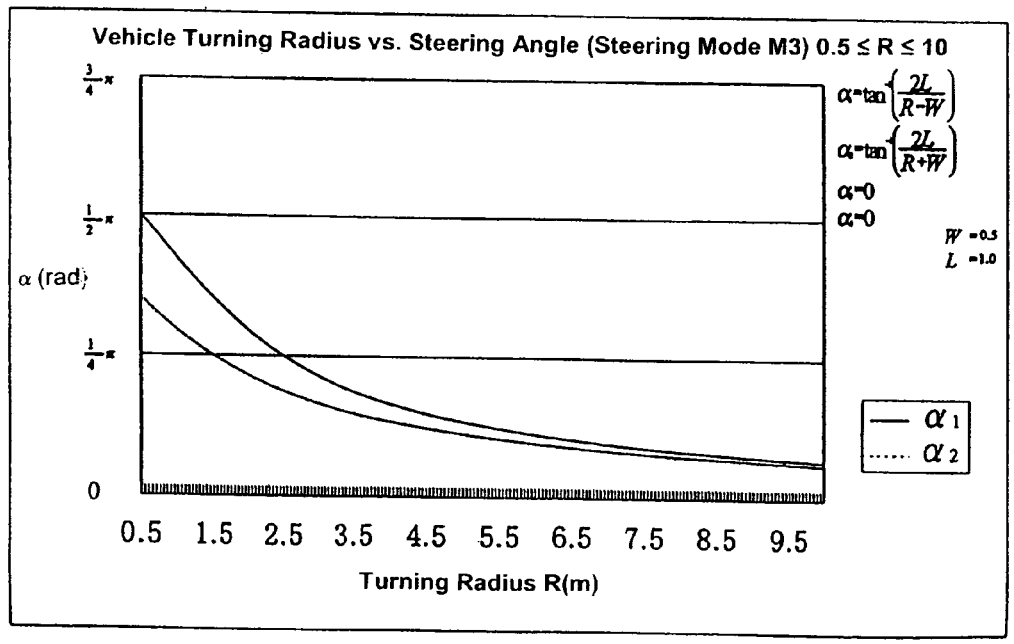
FIG. 9 is a graph showing the relationship between vehicle turning radius and steering angle in steering mode M3.

If the distance R and steering angles $\alpha_1$, $\alpha_2$, $\alpha_3$, and $\alpha_4$ are determined for W=0.5 m and. L=1 m, steering mode M1 will have the characteristic of FIG. 8, and steering mode M3 will have the characteristic of FIG. 9. Next, using steering mode M1 as an example, if the vehicle were to be steered such as to change R from 1 m to 2 m, we can see from FIG. 8 that this changes a, from 63.2 to 33.7 degrees, for a change of 63.2−33.7=29.5 degrees; and changes $\alpha_2$ from 33.7 to 21.8 degrees, for a change of 33.7−21.8=11.9 degrees. Now, when this steering is performed, if the steering angles $\alpha_1$ and $\alpha_2$ are changed with the wheels all turning at the same angular velocity, when the steering angle $\alpha_2$[(left front wheel)] has turned fully to its target value, the steering angle $\alpha_1$ [(right front wheel)] will still be turning toward its target value, putting the left and right [front] wheels in a toe-out state with respect to the direction of travel of the vehicle. If the vehicle is steered by changing R from 2 m to 1 m, the opposite, toe-in condition will exist. When this toe-in/out phenomenon occurs, it can apply excessive force to the steering mechanism, and can also cause anyone riding in/on the vehicle to pitch forward, creating a dangerous situation. Toe-in/out phenomena, then, must be prevented. We know that to prevent toe-in/out phenomena, the condition equations E11 and E12 must be satisfied for all cross-sections of time during which the vehicle is in motion. This is true not only in steering mode M1, but also in modes M2, M3, M4, and M5. This state wherein the values of the steering angles (direction of travel) of the wheels of the vehicle are such that the applicable steering constraint condition equations are satisfied is referred to in this application as 'steering angle conformance.'

One way to maintain steering angle conformance would be for the driver, when changing the distance R (the steering command value) to a new steering command value (distance), thus to change the steering angles $\alpha_1$, $\alpha_2$, $\alpha_3$, $\alpha_4$, to do so by changing the steering command value (distance) R gradually, while periodically computing new steering angles that satisfy the [applicable] steering constraint condition equations, thus causing the steering angles $\alpha_1$, $\alpha_2$, $\alpha_3$, $\alpha_4$ to change gradually such that after the short steering command lag time, the steering command value (distance) R will have been taken to the newly set steering command value (the target steering command value to exist after the change), and the steering angles $\alpha_1$, $\alpha_2$, $\alpha_3$, $\alpha_4$ will have made the transition to the desired steering angles corresponding to said newly set steering command value.

In other words, the steering control method of the present invention is characterized in that, in steering control wherein, by changing a steering command value, the direction of travel of a vehicle is changed by separately controlling the steering angles $\alpha_1$, $\alpha_2$, $\alpha_3$, $\alpha_4$ and the speeds of rotation n1, n2, n3, n4 of the four wheels of the vehicle in accordance with steering constraint condition equations for defining a prescribed mode, wherein a command value is defined as a distance R, which is the distance between a point central to the positions of the four wheels, and the center points of concentric arcs described by the turning-vehicle-travel-paths of the wheels; in a process for changing the command value R from a value $R_1$ to a value $R_2$, for transitioning the steering angles $\alpha_1$, $\alpha_2$, $\alpha_3$, $\alpha_4$ from the values $[\alpha_1, \alpha_2, \alpha_3, \alpha_4]_{R1}$, which correspond to the command value $R_1$, to the values $[\alpha_1, \alpha_2, \alpha_3, \alpha_4]_{R2}$, which correspond to the command value $R_2$;

incremental transition steering angles $[\alpha_1, \alpha_2, \alpha_3, \alpha_4]_{R1+\Delta R}$ and incremental transition rotation speeds [n1, n2, n3, n4]$_{R1+\Delta R}$ corresponding to the steering command value ($R_1+\Delta R$), which is the steering command value $R_1$ to which an incremental steering command value $\Delta R$ has been added, are computed as values such that said steering constraint condition equations will be satisfied;

the steering angles $\alpha_1$, $\alpha_2$, $\alpha_3$, $\alpha_4$ and rotation speeds n1, n2, n3, n4 are changed toward the incremental transition steering angles $[\alpha_1, \alpha_2, \alpha_3, \alpha_4]_{R1+\Delta R}$ and incremental transition rotation speeds [n1, n2, n3, n4]$_{R1+\Delta R}$;

when the steering angles $\alpha_1$, $\alpha_2$, $\alpha_3$, $\alpha_4$ have reached the incremental transition steering angles $[\alpha_1, \alpha_2, \alpha_3, \alpha_4]_{R1+\Delta R}$ and steering angle conformance has been detected; incremental transition steering angles $[\alpha_1, \alpha_2, \alpha_3, \alpha_4]_{R1+2\Delta R}$ and incremental transition rotation speeds [n1, n2, n3, n4]$_{R1+2\Delta R}$ corresponding to the steering command value ($R_1+2\Delta R$), which is the steering command value ($R_1+\Delta R$) to which an additional incremental steering command value $\Delta R$ has been added, are computed as values such that said steering constraint condition equations will be satisfied;

the steering angles $\alpha_1$, $\alpha_2$, $\alpha_3$, $\alpha_4$ and wheel rotation speeds n1, n2, n3, n4 are changed toward the incremental transition steering angles $[\alpha_1, \alpha_2, \alpha_3, \alpha_4]_{R1+2\Delta R}$ and incremental transition rotation speeds [n1, n2, n3, n4]$_{R1+2\Delta R}$; and from this point on, proceeding in the same manner as above, when steering angle conformance of the wheel steering angles $\alpha_1$, $\alpha_2$, $\alpha_3$, $\alpha_4$ has been detected, incremental transition steering angles $[\alpha_1, \alpha_2, \alpha_3, \alpha_4]_{R1+n\Delta R}$ and incremental transition rotation speeds [n1, n2, n3, n4]$_{R1+n\Delta R}$ corresponding to the steering command value ($R_1+n\Delta R$), which is the steering command value $R_1$ to which the incremental steering command value $\Delta R$ has been added n times, are computed as values such that said steering constraint condition equations will be satisfied;

the steering angles $\alpha_1$, $\alpha_2$, $\alpha_3$, $\alpha_4$ and wheel rotation speeds n1, n2, n3, n4 are changed toward the incremental transition steering angles $[\alpha_1, \alpha_2, \alpha_3, \alpha_4]_{R1+n\Delta R}$ and incremental transition rotation speeds [n1, n2, n3, n4]$_{R1+n\Delta R}$; and when the steering angles $\alpha_1$, $\alpha_2$, $\alpha_3$, $\alpha_4$ have reached the incremental transition steering angles $[\alpha_1, \alpha_2, \alpha_3, \alpha_4]_{R1+\Delta nR}$ and steering angle conformance has been detected, the above process is repeated, continuing until the respective steering angles $\alpha_1$, $\alpha_2$, $\alpha_3$, $\alpha_4$ have been changed from the steering angles $[\alpha_1, \alpha_2, \alpha_3, \alpha_4]_{R1}$ to the steering angles $[\alpha_1, \alpha_2, \alpha_3, \alpha_4]_{R2}$.

Next, we will consider the sensitivity of wheel steering angles $\alpha$ with respect to the steering command value distance R (vehicle turning radius) in steering mode M1. In general, because we have formula (1) and formula (2), shown below, condition equation (E11) can be expanded as follows:

If $y = \tan^{-1} x$, then $$\frac{dy}{dx} = \frac{1}{1+x^2} \qquad \text{Formula (1)}$$

and if $$y = \frac{1}{x},$$

then $$\frac{dy}{dx} = -\frac{1}{x^2} \qquad \text{Formula (2)}$$

$$\alpha_1 = -\alpha_3 = \tan^{-1}\left(\frac{L}{R-W}\right) \qquad \text{(E11)}$$

$$\frac{d\alpha_1}{dR} = -\frac{d\alpha_3}{dR} = \frac{1}{1+\left(\frac{L}{R-W}\right)^2} \frac{(-L)}{(R-W)} = \frac{-L}{(R-W)^2+L^2} \qquad \text{Equation (1)}$$

Similarly, $$\frac{d\alpha_2}{dR} = -\frac{d\alpha_4}{dR} = \frac{-L}{(R+W)^2+L^2} \qquad \text{Equation (2)}$$

Figure 10:
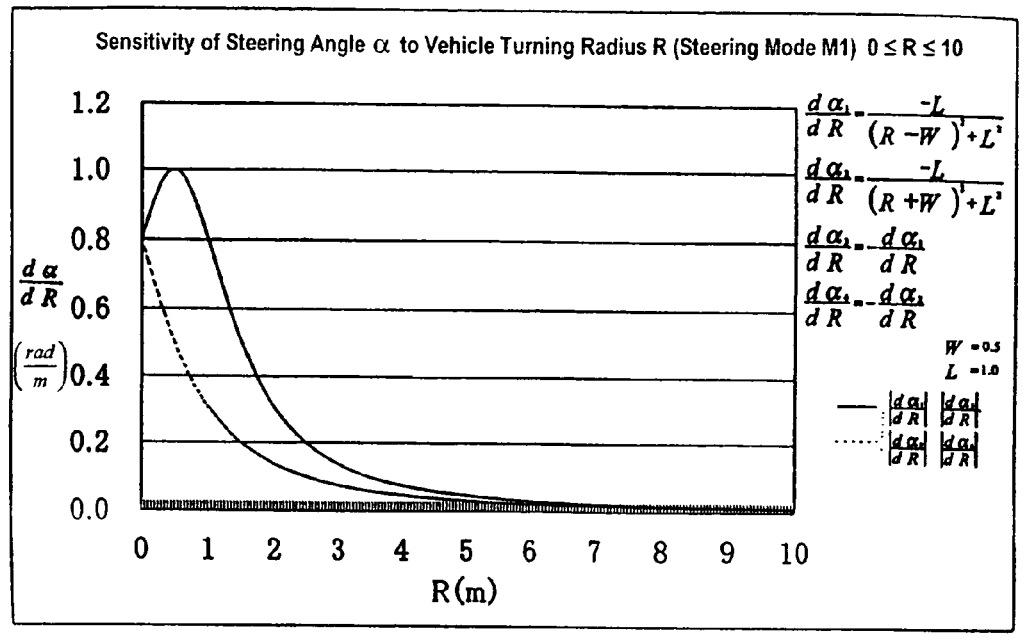
FIG. 10 is a graph showing how steering angle sensitivity is related to vehicle turning radius in steering mode M1.
Figure 11:
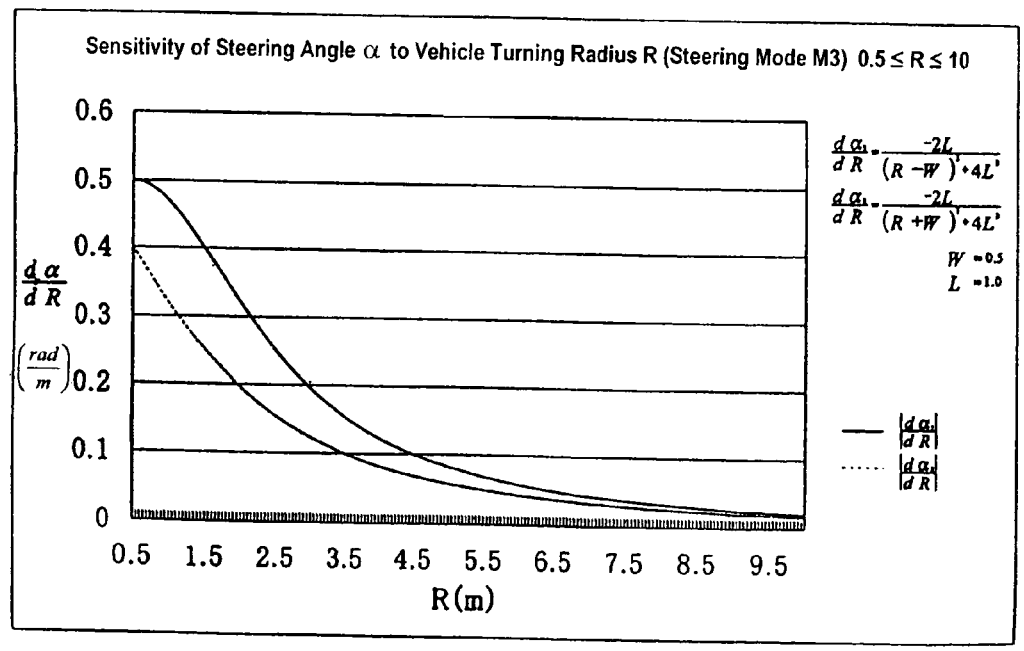
FIG. 11 is a graph showing how steering angle sensitivity is related to vehicle turning radius in steering mode M3.

If we solve equation (1) and equation (2) for the values W=0.5 m and L=1 m, the results are as shown in FIG. 10. As shown in FIG. 10, in the area where R is small, $\alpha$ is highly sensitive to R, and we can see that the sensitivity is different for left and right wheels. FIG. 11 shows the results for the same computations performed for steering mode M3. In this case as well, the $\alpha$ is highly sensitive to R in the area where R is small, and sensitivity differs between left and right wheels.

Thus the sensitivity of the wheel steering angles $\alpha$ to the distance R (the vehicle rotation radius/steering command value) varies widely depending on the value of R. The distance R per se is therefore not a good value to use as the steering command value. A possible consideration would be to introduce distance R as a function of time, R=f (t), and to control wheel steering angles $\alpha$ through the function R=f(t). The function is introduced as follows:

Equation (1) is transformed as follows:

$$\frac{d\alpha_1}{dR} = \frac{d\alpha_1}{dt}\frac{dt}{dR} = \frac{-L}{(R-W)^2+L^2} \qquad \text{Equation (3)}$$

$$\frac{d\alpha_1}{dt} = \frac{-L}{(R-W)^2+L^2}\frac{dR}{dt}$$

Similarly, $$\frac{d\alpha_2}{dt} = \frac{-L}{(R+W)^2 + L^2} \frac{dR}{dt} \quad \text{Equation (4)}$$

Then, setting $$\frac{d\alpha_1}{dt} = K$$

(Where K=constant value)

$$\frac{d\alpha_1}{dt} = K = \frac{-L}{(R-W)^2 + L^2} \frac{dR}{dt} \quad \text{Equation (5)}$$

Accordingly, we then have $$\frac{1}{(R-W)^2 + L^2} dR = -\frac{K}{L} dt \quad \text{Equation (6)}$$

$$\int \frac{1}{(R-W)^2 + L^2} dR = -\int \frac{K}{L} dt \quad \text{Equation (7)}$$

Then by applying formula (3) we eventually arrive at Equation (13); i.e., $$\int \frac{1}{x^2 + a^2} dx = \frac{1}{a} \tan^{-1} \frac{x}{a} \quad \text{Formula (3)}$$

$$\frac{1}{L} \tan^{-1}\left(\frac{R-W}{L}\right) = -\frac{K}{L} t + C \quad \text{Equation (8)}$$

$$\tan^{-1}\left(\frac{R-W}{L}\right) = -Kt + CL \quad \text{Equation (9)}$$

$$\frac{R-W}{L} = \tan(-Kt + CL) \quad \text{Equation (10)}$$

$$R = W + L \tan(-Kt + CL) \quad \text{Equation (11)}$$

Here, if we set R=0 W=0.5 L=1 and t=0, the integration constant CL is CL=0.463648 (rad). Accordingly, if K=π/20, then $$R = W - L \tan(Kt + 0.463648) \quad \text{Equation (12)}$$

$$R = W - L \tan\left(-\frac{\pi}{20} t + 0.463648\right) \quad \text{Equation (13)}$$

Thus the distance R can be varied as a function of time t in Equation (13). When this is done, the right front wheel steering angle $\alpha_1$ and left front wheel steering angle $\alpha_2$ are given by Equations (14), (15), and (16), as follows:

$$\alpha_1 = \tan^{-1}\left(\frac{L}{R-W}\right) \quad \text{(E11)}$$

$$\alpha_1 = \tan^{-1}\left(\frac{1}{\tan\left(-\frac{\pi}{20} t + 0.463648\right)}\right) \quad \text{Equation (14)}$$

$$\alpha_2 = \tan^{-1}\left(\frac{L}{R+W}\right) \quad \text{(E12)}$$

$$\alpha_2 = \tan^{-1}\left(\frac{1}{\frac{2W}{L} - \tan\left(-\frac{\pi}{20} t + 0.463648\right)}\right) \quad \text{Equation (15)}$$

$$\alpha_2 = \tan^{-1}\left(\frac{1}{1 - \tan\left(-\frac{\pi}{20} t + 0.463648\right)}\right) \quad \text{Equation (16)}$$

Figure 12:
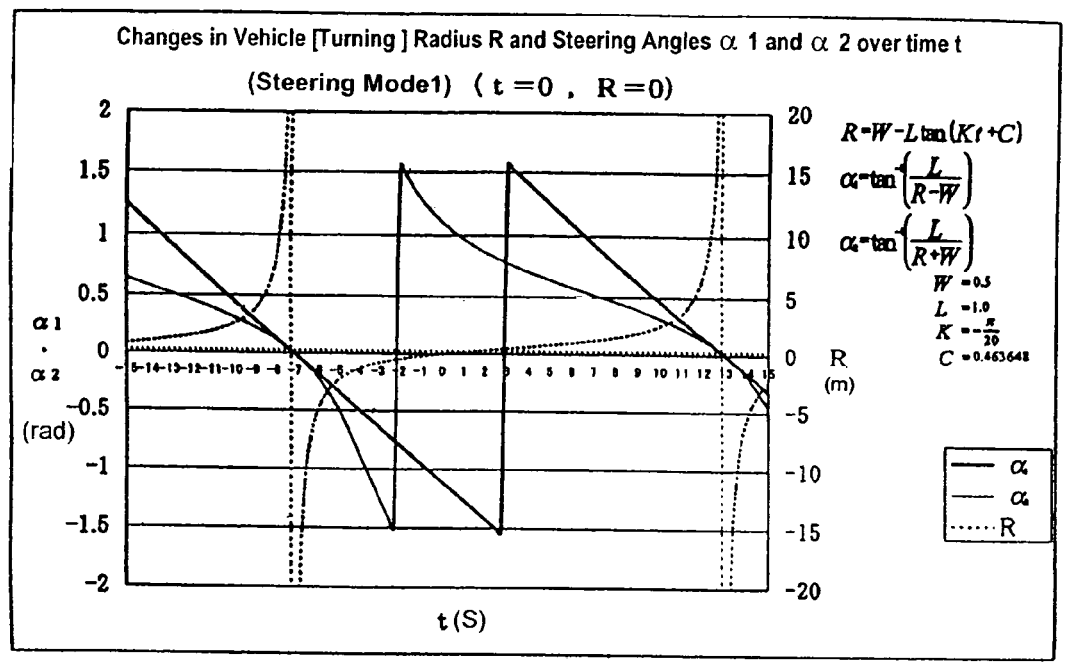
FIG. 12 is a graph showing how vehicle turning radius and steering angle are related to time in steering mode M1.

FIG. 12 shows variation in distance R, right wheel steering angle $\alpha_1$ and left wheel steering angle $\alpha_2$ against time t. From this, we know that variations in right wheel steering angle $\alpha_1$ are linear over time t. Thus when R (the distance between the vehicle's center-of-rotation and the vehicle front-to-rear center line Y) is used as the command value, the variation in dα/dR is large in regions of R variation; therefore, good control can be realized by introducing a new function of distance R and time t, R=f(t), that will make this [(dα/dR)] constant (e.g. in steering mode M1, R=W+L tan(−Kt+CL)), controlling distance R as a function of time t, and controlling steering angles α from that distance R.

As described above, although using the distance R as the steering command value simplifies theoretical development, when it comes to a driver actually controlling the steering, it would definitely make steering operations difficult. The difference in sensitivity dα/dR at low and high values of distance R is in the double digits. Also, in the range of steering angles near the straight forward direction of the vehicle where, in actual driving, the frequency [of steering events] is highest, the sensitivity dα/dR is high, making the steering hyper-sensitive. Also, the distance R value could abruptly invert between −∞ and +∞ or between +∞ and −∞. Moreover, since the distance R is the distance to the center-of-rotation in the lateral direction of the vehicle, for the driver, it would be very difficult to associate this with an actual 'feel' for the steering of the vehicle. These factors make operation extremely difficult for the driver.

Therefore, in the present invention, instead of the distance R, the angle $\alpha_o$ is used for the steering command value. The angle $\alpha_o$ is the angle formed between the center line of the vehicle and the direction of travel of the point Po, which marks the center of a line connecting the left and right front wheels.

That is, in steering mode M1 (FIG. 3), for example, $$\tan \alpha_0 = \frac{L}{R} \quad \text{Equation (17)}$$

$$R = \frac{L}{\tan \alpha_0} \quad \text{Equation (18)}$$

Then by substituting equation (18) in equations (E11), (E12), and (E13), the relationship between the steering angles $\alpha_1$, $\alpha_2$, $\alpha_3$, $\alpha_4$, and wheel rotation speeds n1, n2, n3, n4 can be expressed by the following equations:

$$\alpha_1 = -\alpha_3 = \tan^{-1}\left(\frac{L}{\frac{L}{\tan \alpha_0} - W}\right) = \tan^{-1}\left(\frac{1}{\frac{1}{\tan \alpha_0} - \frac{W}{L}}\right) \quad \text{Equation (19)}$$

-continued $$\alpha_2 = -\alpha_4 = \tan^{-1}\left(\frac{L}{\frac{L}{\tan\alpha_0} + W}\right) = \tan^{-1}\left(\frac{1}{\frac{1}{\tan\alpha_0} + \frac{W}{L}}\right) \quad \text{Equation (20)}$$

$$n_1 : n_2 : n_3 : n_4 = \quad \text{Equation (21)}$$

$$\sqrt{\left(\frac{L}{\tan\alpha_0} - W\right)^2 + L^2} : \sqrt{\left(\frac{L}{\tan\alpha_0} + W\right)^2 + L^2} :$$

$$\sqrt{\left(\frac{L}{\tan\alpha_0} - W\right)^2 + L^2} : \sqrt{\left(\frac{L}{\tan\alpha_0} + W\right)^2 + L^2}$$

In steering mode M3 (FIG. 5), $$\tan\alpha_0 = \frac{2L}{R} \quad \text{Equation (22)}$$

$$R = \frac{2L}{\tan\alpha_0} \quad \text{Equation (23)}$$

By substituting equation (23) in equations (E31), (E32), and (E34), the relationship between the steering angles $\alpha_1$, $\alpha_2$, and the wheel rotation speeds n1, n2, n3, n4 can be expressed by the following equations:

$$\alpha_1 = \tan^{-1}\left(\frac{2L}{\frac{2L}{\tan\alpha_0} - W}\right) = \tan^{-1}\left(\frac{1}{\frac{1}{\tan\alpha_0} - \frac{W}{2L}}\right) \quad \text{Equation (24)}$$

$$\alpha_2 = \tan^{-1}\left(\frac{1}{\frac{1}{\tan\alpha_0} + \frac{W}{2L}}\right) \quad \text{Equation (25)}$$

$$n_1 : n_2 : n_3 : n_4 = \sqrt{\left(\frac{2L}{\tan\alpha_0} - W\right)^2 + (2L)^2} : \quad \text{Equation (26)}$$

$$\sqrt{\left(\frac{2L}{\tan\alpha_0} + W\right)^2 + (2L)^2} : \left|\frac{2L}{\tan\alpha_0} - W\right| : \left|\frac{2L}{\tan\alpha_0} + W\right|$$

Figure 13:
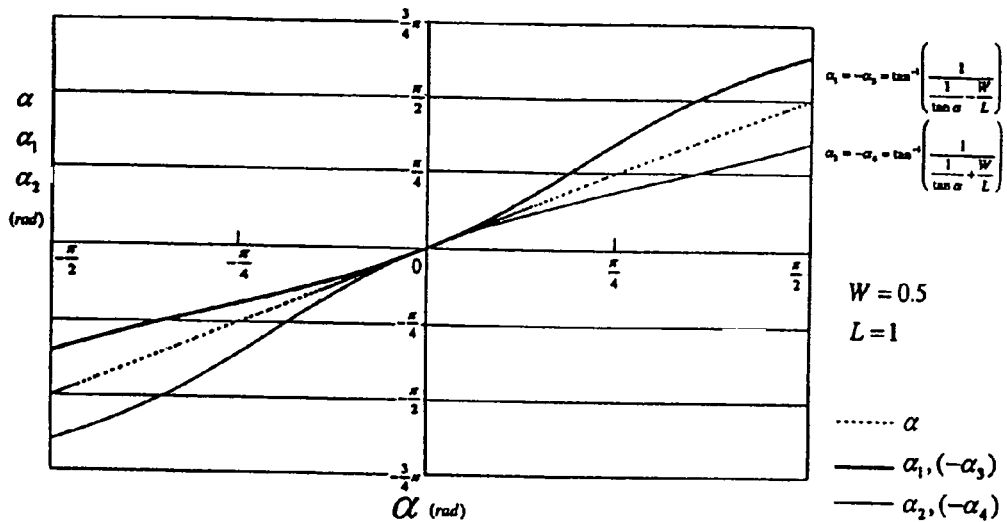
FIG. 13 is a graph showing the relationship between steering command value and the steering angles of the wheels in steering mode M1.
Figure 14:
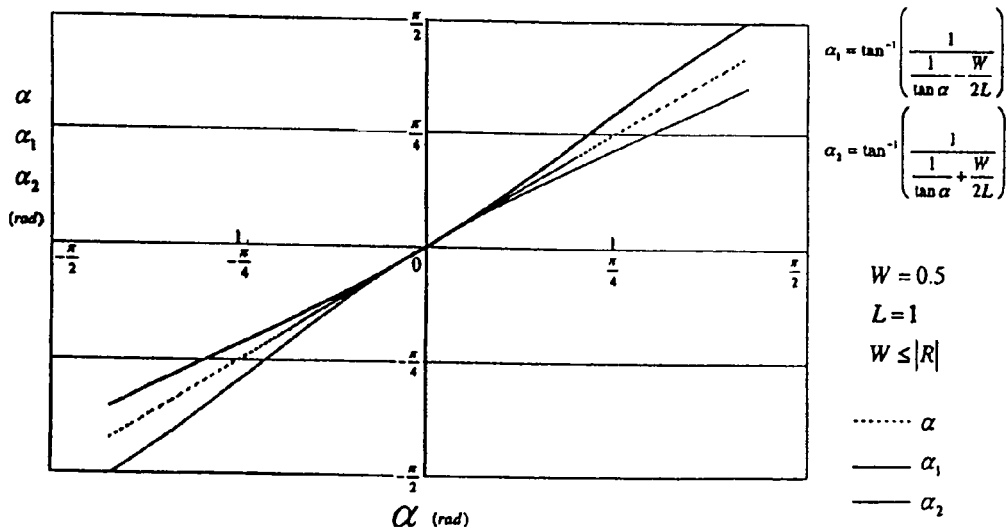
FIG. 14 is a graph showing the relationship between steering command value and the steering angles of the wheels in steering mode M3.

The relationships between the angle $\alpha_o$, (the angle formed between the vehicle center line Y and the direction of travel of the center point Po) and the steering angles of the wheels $\alpha_1$, $\alpha_2$, $\alpha_3$, $\alpha_4$, for values of W=0.5 m and L=1 m, are shown for steering modes M1 and M3 in FIG. 13 and FIG. 14, respectively. Thus by using the angle $\alpha_o$ (the angle formed between the vehicle center line Y and the direction of travel of the center point Po of a line connecting the left and right front wheels) as the steering command value for steering control, we can eliminate control system hypersensitivity and discontinuity characteristics that caused problems when the distance R was used as the steering command value. This makes it possible for a driver to execute steering control that seems right in terms of his or her sense of the direction in which the vehicle is actually being steered.

Also, instead of this center point Po (described above), an angle $\alpha_n$, which is the angle formed between the vehicle center line Y and the direction of travel of a point Pn (arbitrarily located on the vehicle at the coordinates $x_n,y_n$), could be used as the steering command value. (See FIGS. 3 and 5.)

When the angle $\alpha_n$, the angle formed between the vehicle center line Y and the direction of travel of the point Pn (arbitrarily located on the vehicle at the coordinates $x_n,y_n$) is used as the command value, the relationships between the angle $\alpha_n$ and the $P_n$ coordinates $x_n,y_n$ are given by $$\tan\alpha_n = \frac{y_n}{R - x_n} \quad \text{Equation (27)}$$

$$R = x_n + \frac{y_n}{\tan\alpha_n} \quad \text{Equation (28)}$$

For steering mode M1, the above equation (28) can be substituted in equations (E11), (E12) and (E13) to obtain the following equations (29), (30) and (31), and the wheel steering angles $\alpha_1$, $\alpha_2$, $\alpha_3$, $\alpha_4$, and rotation speeds n1, n2, n3, n4 can then be controlled based on $\alpha_n$, the direction of travel of the point Pn (steering command value):

$$\alpha_1 = -\alpha_3 = \tan^{-1}\left(\frac{L}{R - W}\right) \quad \text{(E11)}$$

$$\alpha_1 = -\alpha_3 = \tan^{-1}\left(\frac{L}{x_n + \frac{y_n}{\tan\alpha_n} - W}\right) \quad \text{Equation (29)}$$

$$\alpha_2 = -\alpha_4 = \tan^{-1}\left(\frac{L}{R + W}\right) \quad \text{(E12)}$$

$$\alpha_2 = -\alpha_4 = \tan^{-1}\left(\frac{L}{x_n + \frac{y_n}{\tan\alpha_n} + W}\right) \quad \text{Equation (30)}$$

$$n_1 : n_2 : n_3 : n_4 = \sqrt{\left(x_n + \frac{y_n}{\tan\alpha_n} - W\right)^2 + L^2} : \quad \text{Equation (31)}$$

$$\sqrt{\left(x_n + \frac{y_n}{\tan\alpha_n} + W\right)^2 + L^2} :$$

$$\sqrt{\left(x_n + \frac{y_n}{\tan\alpha_n} - W\right)^2 + L^2} :$$

$$\sqrt{\left(x_n + \frac{y_n}{\tan\alpha_n} + W\right)^2 + L^2}$$

For steering mode M3, $$\tan\alpha_n = \frac{L + y_n}{R - x_n}$$

$$R = \frac{L + y_n}{\tan\alpha_n} + x_n$$

$$a_1 = \tan^{-1}\left(\frac{2L}{x_n + \frac{y_n}{\tan\alpha_n} - W}\right) \quad \text{Equation (32)}$$

$$a_2 = \tan^{-1}\left(\frac{2L}{x_n + \frac{y_n}{\tan\alpha_n} + W}\right) \quad \text{Equation (33)}$$

$$\alpha_3 = \alpha_4 = 0 \quad \text{Equation (E33)}$$

$$n_1 : n_2 : n_3 : n_4 = \sqrt{\left(x_n + \frac{y_n}{\tan\alpha_n} - W\right)^2 + (2L)^2} : \quad \text{Equation (34)}$$

$$\sqrt{\left(x_n + \frac{y_n}{\tan\alpha_n} + W\right)^2 + (2L)^2} :$$

$$\left|x_n + \frac{y_n}{\tan\alpha_n} - W\right| : \left|x_n + \frac{y_n}{\tan\alpha_n} + W\right|$$

As is clear from the above examples, according to the four-wheel-independent-steering vehicle steering control method of the present invention, wherein one of the variables of a steering constraint condition equation for forming a prescribed steering mode is defined as the steering command value S; in a process for changing the steering command value S from a value $S_1$ to a value $S_2$, for transitioning the steering angles $\alpha_1$, $\alpha_2$, $\alpha_3$, $\alpha_4$ from the values $[\alpha_1, \alpha_2, \alpha_3, \alpha_4]_{S1}$, which correspond to the command value $S_1$, to the values $[\alpha_1, \alpha_2, \alpha_3, \alpha_4]_{S2}$, which correspond to the command value $S_{S2}$;

incremental transition steering angles $[a_1, \alpha_2, \alpha_3, \alpha_4]_{S1+\Delta S}$ corresponding to the steering command value $(S_1+\Delta S)$, which is the steering command value $S_1$ to which an incremental steering command value $\Delta S$ has been added, are computed as values such that said steering constraint condition equations will be satisfied;

the steering angles $\alpha_1$, $\alpha_2$, $\alpha_3$, $\alpha_4$ are changed toward the incremental transition steering angles $[\alpha_1, \alpha_2, \alpha_3, \alpha_4]_{S1+\Delta S}$, and when the steering angles $\alpha_1$, $\alpha_2$, $\alpha_3$, $\alpha_4$ have reached the incremental transition steering angles $[\alpha_1, \alpha_2, \alpha_3, \alpha_4]_{S1+\Delta S}$, and steering angle conformance is detected, incremental transition steering angles $[\alpha_1, \alpha_2, \alpha_3, \alpha_4]_{S1+n\Delta S}$ corresponding to the steering command value $(S_1+n\Delta S)$, which is the steering command value $S_1$ to which the incremental steering command value $\Delta S$ has been added n times in succession, are computed as values such that said steering constraint condition equations will be satisfied, the steering angles $\alpha_1$, $\alpha_2$, $\alpha_3$, $\alpha_4$ are changed toward the incremental transition steering angles $[\alpha_1, \alpha_2, \alpha_3, \alpha_4]_{S1+n\Delta S}$; and the wheel steering angles $\alpha_1$, $\alpha_2$, $\alpha_3$, $\alpha_4$ are changed from steering angles $[\alpha_1, \alpha_2, \alpha_3, \alpha_4]_{S1}$ corresponding to the steering command value $S_1$, to steering angles $[\alpha_1, \alpha_2, \alpha_3, \alpha_4]_{S2}$, corresponding to the steering command value $S_2$, thus preventing the occurrence of severe wheel toe-in/out phenomena in the vehicle steering process.

Also, according to the present invention, a steering angle $\alpha_n$ (the angle formed between a center line Y between the left and right front wheels of the vehicle and the direction of travel of a point Pn, an arbitrary point on the vehicle, such as, for example, the location at which the driver stands; or an angle $\alpha_o$ (the angle formed between a center line Y between the left and right front wheels of the vehicle and the direction of travel of a center point Po on a line connecting the left and right front wheels) may be used as the command value. This adapts the steering command value to the driver's sense of steering direction, thus preventing steering operation errors by the driver and facilitating quick and accurate steering in the desired direction.

Also, according to the present invention, when the vehicle is started out from a stop, or when the prescribed steering mode is changed, the steering angles $\alpha_1$, $\alpha_2$, $\alpha_3$, $\alpha_4$ of the wheels are first momentarily reset to the 0-degree straight ahead value before separately changing the steering angles $\alpha_1$, $\alpha_2$, $\alpha_3$, $\alpha_4$ as required to conform to the steering constraint condition equations for the prescribed mode.

Also, according to the present invention, when the vehicle is just starting out or is changing modes, it does so only after the steering angles of the wheels $\alpha_1$, $\alpha_2$, $\alpha_3$, $\alpha_4$ are in conformance with the steering constraint condition equations that define the prescribed mode. This improves driving safety by reducing the chance for collisions when the vehicle is starting out from a stopped state, or when the steering mode is changed. It enables the vehicle to start out accurately and smoothly in the desired direction and in the prescribed steering mode when starting out from a stop or making a steering mode change.

The foregoing describes preferred embodiments of the invention. A variety of modifications could be made, however, without deviating from the scope of the invention as defined by the following claims:

The claimed invention is:

1. A four-wheel-independent-steering-vehicle steering control method comprising:
   (a) using one of variables of steering constraint condition equations for forming a prescribed steering mode as a steering command value S and changing the steering command value S from a value $S_1$ to a value $S_2$;
   (b) computing incremental transition steering angles of four wheels $[\alpha_1, \alpha_2, \alpha_3, \alpha_4]_{S1+\Delta S}$ corresponding to a steering command value $(S_1+\Delta S)$, which is the steering command value $S_1$ to which an incremental steering command value $\Delta S$ has been added, in accordance with the steering constraint condition equations;
   (c) changing steering angles of the four wheels $\alpha_1$, $\alpha_2$, $\alpha_3$, $\alpha_4$ toward the incremental transition steering angles $[\alpha_1, \alpha_2, \alpha_3, \alpha_4]_{S1+\Delta S}$;
   (d) detecting a steering angle conformance, wherein the steering angles $\alpha_1$, $\alpha_2$, $\alpha_3$, $\alpha_4$ have reached the incremental transition steering angles $[\alpha_1, \alpha_2, \alpha_3, \alpha_4]_{S1+\Delta S}$;
   (e) computing next incremental transition steering angles $[\alpha_1, \alpha_2, \alpha_3, \alpha_4]_{S1+2\Delta S}$ corresponding to a steering command value $(S_1+2\Delta S)$, in accordance with the steering constraint condition equations;
   (f) changing the steering angles $\alpha_1$, $\alpha_2$, $\alpha_3$, $\alpha_4$ toward the next incremental transition steering angles $[\alpha_1, \alpha_2, \alpha_3, \alpha_4]_{S1+2\Delta S}$;
   (g) detecting a steering angle conformance, wherein the steering angles $\alpha_1$, $\alpha_2$, $\alpha_3$, $\alpha_4$ have reached the next incremental transition steering angles $[\alpha_1, \alpha_2, \alpha_3, \alpha_4]_{S1+2\Delta S}$; and
   (h) repeating above Steps (e)–(g) until the steering angles $\alpha_1$, $\alpha_2$, $\alpha_3$, $\alpha_4$ reach steering angles $[\alpha_1, \alpha_2, \alpha_3, \alpha_4]_{S2}$ corresponding to the steering command value $S_2$.

2. A four-wheel-independent-steering-vehicle steering control method comprising:
   (a) using one of variables of steering constraint condition equations for forming a prescribed steering mode as a steering command value S and changing the steering command value S from a value $S_1$ to a value $S_2$;
   (b) computing incremental transition steering angles of four wheels $[\alpha_1, \alpha_2, \alpha_3, \alpha_4]_{S1+\Delta S}$ and incremental transition speeds of rotation of the four wheels $[n_1, n_2, n_3, n_4]_{S1+\Delta S}$ corresponding to a steering command value $(S_1+\Delta S)$, which is the steering command value $S_1$ to which an incremental steering command value $\Delta S$ has been added, in accordance with the steering constraint condition equations;
   (c) changing the steering angles $\alpha_1$, $\alpha_2$, $\alpha_3$, $\alpha_4$ and speeds of rotation $n_1$, $n_2$, $n_3$, $n_4$ toward the incremental transition steering angles $[\alpha_1, \alpha_2, \alpha_3, \alpha_4]_{S1+\Delta S}$ and the incremental transition speeds of rotation $[n_1, n_2, n_3, n_4]_{S1+\Delta S}$, respectively;
   (d) detecting a steering angle conformance, wherein the steering angles $\alpha_1$, $\alpha_2$, $\alpha_3$, $\alpha_4$ have reached the incremental transition steering angles $[\alpha_1, \alpha_2, \alpha_3, \alpha_4]_{S1+\Delta S}$;
   (e) computing next incremental transition steering angles $[\alpha_1, \alpha_2, \alpha_3, \alpha_4]_{S1+2\Delta S}$ and next incremental transition speeds of rotation $[n_1, n_2, n_3, n_4]_{S1+2\Delta S}$ corresponding to a steering command value $(S_1+2\Delta S)$, respectively, in accordance with the steering constraint condition equations;
   (f) changing the steering angles $\alpha_1$, $\alpha_2$, $\alpha_3$, $\alpha_4$ and the speeds of rotation $n_1$, $n_2$, $n_3$, $n_4$ toward the next incremental transition steering angles $[\alpha_1, \alpha_2, \alpha_3, \alpha_4]_{S1+2\Delta S}$ and the next incremental transition speeds of rotation $[n_1, n_2, n_3, n_4]_{S1+2\Delta S}$, respectively;

(g) detecting a steering angle conformance, wherein the steering angles of the four wheels $\alpha_1, \alpha_2, \alpha_3, \alpha_4$ have reached the incremental transition steering angles of the four wheels $[\alpha_1, \alpha_2, \alpha_3, \alpha_4]_{S1+2\Delta S}$; and (h) repeating above Steps (e)–(g) until the steering angles of the four wheels $\alpha_1, \alpha_2, \alpha_3, \alpha_4$ reach the steering angles $[\alpha_1, \alpha_2, \alpha_3, \alpha_4]_{S2}$ corresponding to the steering command value $S_2$.

3. A four-wheel-independent-steering-vehicle steering control method comprising:
   (a) using one of variables of steering constraint condition equations for forming a prescribed steering mode as a steering command value R which is a distance between a point central to positions of four wheels and a center point of concentric arcs, and changing the steering command value R from a value $R_1$ to a value $R_2$;
   (b) computing incremental transition steering angles of the four wheels $[\alpha_1, \alpha_2, \alpha_3, \alpha_4]_{R1+\Delta R}$ corresponding to a steering command value $(R_1+\Delta R)$, which is the steering command value $R_1$ to which an incremental steering command value $\Delta R$ has been added, in accordance with the steering constraint condition equations;
   (c) changing the steering angles of the four wheels $\alpha_1, \alpha_2, \alpha_3, \alpha_4$ toward the incremental transition steering angles $[\alpha_1, \alpha_2, \alpha_3, \alpha_4]_{R1+\Delta R}$;
   (d) detecting a steering angle conformance, wherein the steering angles $\alpha_1, \alpha_2, \alpha_3, \alpha_4$ have reached the incremental transition steering angles $[\alpha_1, \alpha_2, \alpha_3, \alpha_4]_{R1+\Delta R}$;
   (e) computing next incremental transition steering angles $[\alpha_1, \alpha_2, \alpha_3, \alpha_4]_{R1+2\Delta R}$ corresponding to a steering command value $(R_1+2\Delta R)$, in accordance with the steering constraint condition equations;
   (f) changing the steering angles $\alpha_1, \alpha_2, \alpha_3, \alpha_4$ toward the next incremental transition steering angles $[\alpha_1, \alpha_2, \alpha_3, \alpha_4]_{R1+2\Delta R}$;
   (g) detecting a steering angle conformance, wherein the steering angles $\alpha_1, \alpha_2, \alpha_3, \alpha_4$ have reached the next incremental transition steering angles $[\alpha_1, \alpha_2, \alpha_3, \alpha_4]_{R1+2\alpha R}$; and
   (h) repeating above Steps (e)–(g) until the steering angles $\alpha_1, \alpha_2, \alpha_3, \alpha_4$ reach the steering angles $[\alpha_1, \alpha_2, \alpha_3, \alpha_4]_{R2}$ corresponding to the steering command value $R_2$.

4. A four-wheel-independent-steering-vehicle steering control method as recited in claim 3, wherein, when wherein turning-vehicle-travel-paths of the wheels are concentric arcs, the steering constraint condition equations for forming the prescribed steering mode are $$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

where
  $\alpha_1, \alpha_2, \alpha_3,$ and $\alpha_4$ are the steering angles of the right front wheel, left front wheel, right rear wheel, and left rear wheel, respectively;
  L is the distance between each wheel and a center line X between the front wheels and rear wheels;
  W is the distance between each wheel and a center line Y between the left wheels and right wheels; and
  R, which is used as the steering command value, is the distance between a point central to the positions of the four wheels and a center point of the concentric arcs.

5. A four-wheel-independent-steering-vehicle steering control method as recited in claim 3, wherein when turning-vehicle-travel-paths of the wheels are concentric arcs, the steering constraint condition equations for forming the prescribed steering mode are $$\alpha_1 = \tan^{-1}\left(\frac{2L}{R-W}\right)$$

$$\alpha_2 = \tan^{-1}\left(\frac{2L}{R+W}\right)$$

$$\alpha_3 = \alpha_4 = 0$$

where
  $\alpha_1, \alpha_2, \alpha_3,$ and $\alpha_4$ are the steering angles of the right front wheel, left front wheel, right rear wheel, and left rear wheel, respectively;
  L is the distance between each wheel and a center line X between the front wheels and rear wheels;
  W is the distance between each wheel and a center line Y between the left wheels and right wheels; and
  R, which is used as the steering command value, is the distance between a point central to the positions of the four wheels and a center point of the concentric arcs.

6. A four-wheel-independent-steering-vehicle steering control method comprising:
   (a) using one of variables of steering constraint condition equations for forming a prescribed steering mode as a steering command value R which is a distance between a point central to positions of four wheels and a center point of concentric arcs, and changing the steering command value R from a value $R_1$ to a value $R_2$;
   (b) computing incremental transition steering angles of the four wheels $[\alpha_1, \alpha_2, \alpha_3, \alpha_4]_{R1+\Delta R}$ and incremental transition speeds of rotation of the four wheels $[n_1, n_2, n_3, n_4]_{R1+\Delta R}$ corresponding to a steering command value $(R_1+\Delta R)$, which is the steering command value $R_1$ to which an incremental steering command value $\Delta R$ has been added, in accordance with the steering constraint condition equations;
   (c) changing the steering angles $\alpha_1, \alpha_2, \alpha_3, \alpha_4$ and speeds of rotation $n_1, n_2, n_3, n_4$ toward the incremental transition steering angles $[\alpha_1, \alpha_2, \alpha_3, \alpha_4]_{R1+\Delta R}$ and the incremental transition speeds of rotation $[n_1, n_2, n_3, n_4]_{R1+\Delta R}$, respectively;
   (d) detecting a steering angle conformance, wherein the steering angles $\alpha_1, \alpha_2, \alpha_3, \alpha_4$ have reached the incremental transition steering angles $[\alpha_1, \alpha_2, \alpha_3, \alpha_4]_{R1+\Delta R}$;
   (e) computing next incremental transition steering angles $[\alpha_1, \alpha_2, \alpha_3, \alpha_4]_{R1+2\Delta R}$ and next incremental transition speeds of rotation $[n_1, n_2, n_3, n_4]_{R1+2\Delta R}$ corresponding to a steering command value $(R_1+2\Delta R)$, respectively, in accordance with the steering constraint condition equations;
   (f) changing the steering angles $\alpha_1, \alpha_2, \alpha_3, \alpha_4$ and the speeds of rotation $n_1, n_2, n_3, n_4$ toward next incremental transition steering angles $[\alpha_1, \alpha_2, \alpha_3, \alpha_4]_{R1+2\Delta R}$;and next incremental transition speeds of rotation $[n_1, n_2, n_3, n_4]_{R1+2\Delta R}$, respectively;

(g) detecting a steering angle conformance, wherein the steering angles $\alpha_1$, $\alpha_2$, $\alpha_3$, $\alpha_4$ have reached the incremental transition steering angles $[\alpha_1, \alpha_2, \alpha_3, \alpha_4]_{R1+2\Delta R}$; and (h) repeating above Steps (e)–(g) until the steering angles $\alpha_1$, $\alpha_2$, $\alpha_3$, $\alpha_4$ reach the steering angles $[\alpha_1, \alpha_2, \alpha_3, \alpha_4]_{R2}$ corresponding to the steering command value $R_2$.

7. A four-wheel-independent-steering-vehicle steering control method as recited in claim 6, wherein when turning-vehicle-travel-paths of the wheels are concentric arcs, the steering constraint condition equations for forming the prescribed steering mode are $$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 :=$$
$$\sqrt{(R-W)^2 + L^2} : \sqrt{(R+W)^2 + L^2} : \sqrt{(R-W)^2 + L^2} : \sqrt{(R+W)^2 + L^2}$$

where $\alpha_1$, $\alpha_2$, $\alpha_3$, and $\alpha_4$ are the steering angles of the right front wheel, left front wheel, right rear wheel, and left rear wheel, respectively;

n1, n2, n3, and n4 are the speeds of rotation of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels; and R, which is used as the command value, is the distance between a point central to the positions of the four wheels and a center point of the concentric arcs.

8. A four-wheel-independent-steering-vehicle steering control method as recited in claim 6, wherein when turning-vehicle-travel-paths of the wheels are concentric arcs, the steering constraint condition equations for forming the prescribed steering mode are $$\alpha_1 = \tan^{-1}\left(\frac{2L}{R-W}\right)$$

$$\alpha_2 = \tan^{-1}\left(\frac{2L}{R+W}\right)$$

$$\alpha_3 = \alpha_4 = 0$$

$$n_1:n_2:n_3:n_4 := \sqrt{(R-W)^2 + (2L^2)} : \sqrt{(R+W)^2 + (2L^2)} : |R-W| : |R+W|$$

where $\alpha_1$, $\alpha_2$, $\alpha_3$, and $\alpha_4$ are the steering angles of the right front wheel, left front wheel, right rear wheel, and left rear wheel, respectively;

n1, n2, n3, and n4 are the speeds of rotation of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels; and R, which is used as the command value, is the distance between a point central to the positions of the four wheels and a center point of the concentric arcs.

9. A four-wheel-independent-steering-vehicle steering control method comprising:

(a) using one of variables of steering constraint condition equations for forming a prescribed steering mode as a steering command value $\alpha_n$ which is an angle formed between a center line Y between left and right wheels of the vehicle, and a direction of travel of a point $P_n$, and changing the steering command value $\alpha_n$ from a value $\alpha_{n1}$ to a value $\alpha_{n2}$;

(b) computing incremental transition steering angles of the four wheels $[\alpha_1, \alpha_2, \alpha_3, \alpha_4]_{\alpha n1+\Delta\alpha n}$ corresponding to a steering command value $(\alpha_{n1}+\Delta\alpha_n)$, which is the steering command value $\alpha_{n1}$ to which an incremental steering command value $\Delta\alpha_n$ has been added, in accordance with the steering constraint condition equations;

(c) changing the steering angles of the four wheels $\alpha_1$, $\alpha_2$, $\alpha_3$, $\alpha_4$ toward the incremental transition steering angles $[\alpha_1, \alpha_2, \alpha_3, \alpha_4]_{\alpha n1+\Delta\alpha n}$;

(d) detecting a steering angle conformance, wherein the steering angles $\alpha_1$, $\alpha_2$, $\alpha_3$, $\alpha_4$ have reached the incremental transition steering angles $[\alpha_1, \alpha_2, \alpha_3, \alpha_4]_{\alpha n1+\Delta\alpha n}$;

(e) computing next incremental transition steering angles $[\alpha_1, \alpha_2, \alpha_3, \alpha_4]_{\alpha n1+2\Delta\alpha n}$ corresponding to a steering command value $(\alpha_{n1}+2\Delta\alpha_n)$ in accordance with the steering constraint condition equations;

(f) changing the steering angles $\alpha_1$, $\alpha_2$, $\alpha_3$, $\alpha_4$ toward the next incremental transition steering angles $[\alpha_1, \alpha_2, \alpha_3, \alpha_4]_{\alpha n1+2\Delta\alpha n}$;

(g) detecting a steering angle conformance, wherein the steering angles $\alpha_1$, $\alpha_2$, $\alpha_3$, $\alpha_4$ have reached the next incremental transition steering angles $[\alpha_1, \alpha_2, \alpha_3, \alpha_4]_{\alpha n1+2\Delta\alpha n}$; and (h) repeating above Steps (e)–(g) until the steering angles $\alpha_1$, $\alpha_2$, $\alpha_3$, $\alpha_4$ reach the steering angles $[\alpha_1, \alpha_2, \alpha_3, \alpha_4]_{\alpha n2}$ corresponding to the steering command value $\alpha_{n2}$.

10. A four-wheel-independent-steering-vehicle steering control method as recited in claim 9, wherein the steering constraint condition equations for forming a prescribed steering mode are $$\alpha_1 = -\alpha_3 = \tan^{-1}\left(\frac{L}{x_n + \frac{y_n}{\tan\alpha_n} - W}\right) \text{ and}$$

$$\alpha_2 = -\alpha_4 = \tan^{-1}\left(\frac{L}{x_n + \frac{y_n}{\tan\alpha_n} + W}\right)$$

where $\alpha_1$, $\alpha_2$, $\alpha_3$, and $\alpha_4$ are the steering angles of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels;

$x_n$ and $y_n$ are the x and y coordinates of an arbitrary point on the vehicle, $P_n$; and $\alpha_n$, which is used as the steering command value, is the angle formed between the center line Y between the left and right wheels of the vehicle, and the direction of travel of the point $P_n$.

11. A four-wheel-independent-steering-vehicle steering control method as recited in claim 9, wherein the steering constraint condition equations for forming a prescribed steering mode are $$\alpha_1 = \tan^{-1}\left(\frac{2L}{x_n + \frac{y_n}{\tan\alpha_n} - W}\right)$$

$$\alpha_2 = \tan^{-1}\left(\frac{2L}{x_n + \frac{y_n}{\tan\alpha_n} + W}\right)$$

and $$\alpha_3 = \alpha_4 = 0$$

where $\alpha_1$, $\alpha_2$, $\alpha_3$, and $\alpha_4$ are the steering angles of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels;

$x_n$ and $y_n$ are the x and y coordinates of an arbitrary point on the vehicle, $P_n$; and $\alpha_n$, which is used as the steering command value, is the angle formed between the center line Y between the left and right wheels of the vehicle, and the direction of travel of the point $P_n$.

12. A four-wheel-independent-steering-vehicle steering control method comprising:

(a) using one of variables of steering constraint condition equations for forming a prescribed steering mode as a steering command value $\alpha_n$ which is an angle formed between a center line Y between left and right wheels of the vehicle, and a direction of travel of the point $P_n$, and changing the steering command value $\alpha_n$ from a value $\alpha_{n1}$ to a value $\alpha_{n2}$;

(b) computing incremental transition steering angles of four wheels $[\alpha_1, \alpha_2, \alpha_3, \alpha_4]_{\alpha n1+\Delta\alpha}$ and incremental transition speeds of rotation of the four wheels $[n_1, n_2, n_3, n_4]_{\alpha n1+\Delta\alpha}$ corresponding to a steering command value $(_{\alpha n1}+\Delta\alpha_n)$, which is the steering command value $\alpha_{n1}$ to which an incremental steering command value $\Delta\alpha_n$ has been added, in accordance with the steering constraint condition equations;

(c) changing the steering angles $\alpha_1, \alpha_2, \alpha_3, \alpha_4$ and speeds of rotation $n_1, n_2, n_3, n_4$ toward the incremental transition steering angles $[\alpha_1, \alpha_2, \alpha_3, \alpha_4]_{\alpha n1+\Delta\alpha n}$ and the incremental transition speeds of rotation $[n_1, n_2, n_3, n_4]_{\alpha n1+\Delta\alpha n}$, respectively;

(d) detecting a steering angle conformance, wherein the steering angles $\alpha_1, \alpha_2, \alpha_3, \alpha_4$ have reached the incremental transition steering angles $[\alpha_1, \alpha_2, \alpha_3, \alpha_4]_{\alpha n1+\Delta\alpha n}$;

(e) computing next incremental transition steering angles $[\alpha_1, \alpha_2, \alpha_3, \alpha_4]_{\alpha n1+2\Delta\alpha n}$ and next incremental transition speeds of rotation $[n_1, n_2, n_3, n_4]_{\alpha n1+2\Delta\alpha n}$ corresponding to a steering command value $(\alpha_{n1}+2\Delta\alpha_n)$, respectively, in accordance with the steering constraint condition equations;

(f) changing the steering angles $\alpha_1, \alpha_2, \alpha_3, \alpha_4$ and the speeds of rotation $n_1, n_2, n_3, n_4$ toward the next incremental transition steering angles $[\alpha_1, \alpha_2, \alpha_3,$ $\alpha_4]_{\alpha n1+2\Delta\alpha n}$ and the next incremental transition speeds of rotation $[n_1, n_2, n_3, n_4]_{\alpha n1+2\Delta\alpha n}$, respectively;

(g) detecting a steering angle conformance, wherein the steering angles $\alpha_1, \alpha_2, \alpha_3, \alpha_4$ have reached the incremental transition steering angles $[\alpha_1, \alpha_2, \alpha_3, \alpha_4]_{\alpha n1+2\Delta\alpha n}$; and (h) repeating above Steps (e)–(g) until the steering angles $\alpha_1, \alpha_2, \alpha_3, \alpha_4$ reach the steering angles $[\alpha_1, \alpha_2, \alpha_3, \alpha_4]_{\alpha n2}$ corresponding to the steering command value $\alpha_{n2}$.

13. A four-wheel-independent-steering-vehicle steering control method as recited in claim 12, wherein the steering constraint condition equations for forming the prescribed steering mode are $$\alpha_1 = -\alpha_3 = \tan^{-1}\left(\frac{L}{x_n + \frac{y_n}{\tan\alpha_n} - W}\right)$$

$$\alpha_2 = -\alpha_4 = \tan^{-1}\left(\frac{L}{x_n + \frac{y_n}{\tan\alpha_n} + W}\right) \text{ and}$$

$$n_1:n_2:n_3:n_4 = \sqrt{\left(x_n + \frac{y_n}{\tan\alpha_n} - W\right)^2 + L^2} : \sqrt{\left(x_n + \frac{y_n}{\tan\alpha_n} + W\right)^2 + L^2}$$
$$: \sqrt{\left(x_n + \frac{y_n}{\tan\alpha_n} - W\right)^2 + L^2} : \sqrt{\left(x_n + \frac{y_n}{\tan\alpha_n} + W\right) + L^2}$$

where $\alpha_1, \alpha_2, \alpha_3$, and $\alpha_4$ are the steering angles of the right front wheel, left front wheel, right rear wheel, and left rear wheel, respectively;

n1, n2, n3 and n4 are the speeds of rotation of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels;

$x_n$ and $y_n$ are the x and y coordinates of an arbitrary point on the vehicle, $P_n$; and $\alpha_n$, which is used as the steering command value, is the angle formed between the center line Y between the left and right wheels of the vehicle and the direction of travel of the point $P_n$.

14. A four-wheel-independent-steering-vehicle steering control method as recited in claim 12, wherein the steering constraint condition equations for forming the prescribed steering mode are $$\alpha_1 = \tan^{-1}\left(\frac{2L}{x_n + \frac{y_n}{\tan\alpha_n} - W}\right)$$

$$\alpha_2 = \tan^{-1}\left(\frac{2L}{x_n + \frac{y_n}{\tan\alpha_n} + W}\right)$$

$$\alpha_3 = \alpha_4 = 0 \text{ and}$$

$$n_1:n_2:n_3:n_4 = \sqrt{\left(x_n + \frac{y_n}{\tan\alpha_n} - W\right)^2 + (2L)^2} :$$
$$\sqrt{\left(x_n + \frac{y_n}{\tan\alpha_n} + W\right)^2 + (2L)^2} : \left|x_n + \frac{y_n}{\tan\alpha_n} - W\right| : \left|x_n + \frac{y_n}{\tan\alpha_n} + W\right|$$

where $\alpha_1$, $\alpha_2$, $\alpha_3$, and $\alpha_4$ are the steering angles of the right front wheel, left front wheel, right rear wheel, and left rear wheel, respectively;

n1, n2, n3 and n4 are the speeds of rotation of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels;

$x_n$ and $y_n$ are the x and y coordinates of an arbitrary point on the vehicle, $P_n$; and $\alpha_n$, which is used as the steering command value, is the angle formed between the center line Y between the left and right wheels of the vehicle and the direction of travel of the point $P_n$.

15. A four-wheel-independent-steering-vehicle steering control method comprising:

(a) using one of variables of steering constraint condition equations for forming a prescribed steering mode as a steering command value $\alpha_0$ which is an angle formed between a center line Y between left and right wheels of the vehicle, and a direction of travel of a point $P_0$ which is a center point on a line connecting left and right front wheels, and changing the steering command value $\alpha_0$ from a value $\alpha_{01}$ to a value $\alpha_{0\,2}$;

(b) computing incremental transition steering angles of the four wheels $[\alpha_1, \alpha_2, \alpha_3, \alpha_4]_{\alpha01+\Delta\alpha0}$ corresponding to a steering command value $(\alpha_{01}+\Delta\alpha_0)$, which is the steering command value $\alpha_{01}$ to which an incremental steering command value $\Delta\alpha_0$ has been added, in accordance with the steering constraint condition equations;

(c) changing the steering angles of the four wheels $\alpha_1, \alpha_2, \alpha_3, \alpha_4$ toward the incremental transition steering angles $[\alpha_1, \alpha_2, \alpha_3, \alpha_4]_{\alpha01+\Delta\alpha0}$;

(d) detecting a steering angle conformance, wherein the steering angles $\alpha_1, \alpha_2, \alpha_3, \alpha_4$ have reached the incremental transition steering angles $[\alpha_1, \alpha_2, \alpha_3, \alpha_4]_{\alpha01+\Delta\alpha n}$;

(e) computing next incremental transition steering angles $[\alpha_1, \alpha_2, \alpha_3, \alpha_4]_{\alpha01+2\Delta\alpha0}$ corresponding to a steering command value $(\alpha_{01}+2\Delta\alpha_0)$ in accordance with the steering constraint condition equations;

(f) changing the steering angles $\alpha_1, \alpha_2, \alpha_3, \alpha_4$ toward the next incremental transition steering angles $[\alpha_1, \alpha_2, \alpha_3, \alpha_4]_{\alpha01+2\Delta\alpha0}$;

(g) detecting a steering angle conformance, wherein the steering angles $\alpha_1, \alpha_2, \alpha_3, \alpha_4$ have reached the next incremental transition steering angles $[\alpha_1, \alpha_2, \alpha_3, \alpha_4]_{\alpha01+2\Delta\alpha0}$; and (h) repeating above Steps (e)–(g) until the steering angles $\alpha_n$, $\alpha_2, \alpha_3, \alpha_4$ reach the steering angles $[\alpha_1, \alpha_2, \alpha_3, \alpha_4]_{\alpha02}$ corresponding to the steering command value $\alpha_{0\,2}$.

16. A four-wheel-independent-steering-vehicle steering control method as recited in claim 15, wherein the steering constraint condition equations for forming the prescribed steering mode are $$\alpha_1 = -\alpha_3 = \tan^{-1}\left(\frac{1}{\frac{1}{\tan\alpha_0} - \frac{W}{L}}\right)$$

$$\alpha_2 = -\alpha_4 = \tan^{-1}\left(\frac{1}{\frac{1}{\tan\alpha_0} + \frac{W}{L}}\right)$$

where $\alpha_1$, $\alpha_2$, $\alpha_3$, and $\alpha_4$ are the steering angles of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels; and $\alpha_o$, which is used as the steering command value, is the angle formed between the center line Y between the left and right wheels of the vehicle, and the direction of travel of the point Po, which is the center point on a line connecting the left and right front wheels.

17. A four-wheel-independent-steering-vehicle steering control method as recited in claim 15, wherein the steering constraint condition equations for forming the prescribed steering mode are $$\alpha_1 = \tan^{-1}\left(\frac{1}{\frac{1}{\tan\alpha_0} - \frac{W}{2L}}\right)$$

$$\alpha_2 = \tan^{-1}\left(\frac{1}{\frac{1}{\tan\alpha_0} + \frac{W}{2L}}\right)$$

and $\alpha_3 = \alpha_4 = 0$ where $\alpha_1$, $\alpha_2$, $\alpha_3$, and $\alpha_4$ are the steering angles of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels; and $\alpha_o$, which is used as the steering command value, is the angle formed between the center line Y between the left and right wheels of the vehicle, and the direction of travel of the point Po, which is the center point on a line connecting the left and right front wheels.

18. A four-wheel-independent-steering-vehicle steering control method comprising:

(a) using one of variables of steering constraint condition equations for forming a prescribed steering mode as a steering command value $\alpha_0$ which is an angle formed between a center line Y between left and right wheels of the vehicle, and a direction of travel of a point $P_0$, which is a center point on a line connecting left and right front wheels, and changing the steering command value $\alpha_0$ from a value $\alpha_{01}$ to a value $\alpha_{02}$;

(b) computing incremental transition steering angles of the four wheels $[\alpha_1, \alpha_2, \alpha_3, \alpha_4]_{\alpha01+\Delta\alpha01}$ and incremental transition speeds of rotation of the four wheels $[n_1, n_2, n_3, n_4]_{\alpha01+\Delta\alpha01}$ corresponding to a steering command value $(\alpha_{01}+\Delta\alpha_0)$, which is the steering command value $\alpha_{01}$ to which an incremental steering command value $\Delta\alpha_0$ has been added, in accordance with the steering constraint condition equations;

(c) changing the steering angles $\alpha_1, \alpha_2, \alpha_3, \alpha_4$ and speeds of rotation $n_1, n_2, n_3, n_4$ toward the incremental transition steering angles $[\alpha_1, \alpha_2, \alpha_3, \alpha_4]_{\alpha 01+\Delta\alpha 0}$ and the incremental transition speeds of rotation $[n_1, n_2, n_3, n_4]_{\alpha 01+\Delta\alpha 0}$, respectively;

(d) detecting a steering angle conformance, wherein the steering angles $\alpha_1, \alpha_2, \alpha_3, \alpha_4$ have reached the incremental transition steering angles $[\alpha_1, \alpha_2, \alpha_3, \alpha_4]_{\alpha 01+\Delta\alpha 0}$;

(e) computing next incremental transition steering angles $[\alpha_1, \alpha_2, \alpha_3, \alpha_4]_{\alpha 01+2\Delta\alpha 0}$ and next incremental transition speeds of rotation $[n_1, n_2, n_3, n_4]_{\alpha 01+2\Delta\alpha n}$, an corresponding to a steering command value $(\alpha_{01}+2\Delta\alpha_0)$, respectively, in accordance with the steering constraint condition equations;

(f) changing the steering angles $\alpha_1, \alpha_2, \alpha_3, \alpha_4$ and the speeds of rotation $n_1, n_2, n_3, n_4$ toward the next incremental transition steering angles $[\alpha_1, \alpha_2, \alpha_3, \alpha_4]_{\alpha 01+2\Delta\alpha 0}$ and the next incremental transition speeds of rotation $[n_1, n_2, n_3, n_4]_{\alpha 01+2\Delta\alpha 0}$, respectively;

(g) detecting a steering angle conformance, wherein the steering angles $\alpha_1, \alpha_2, \alpha_3, \alpha_4$ have reached the incremental transition steering angles $[\alpha_1, \alpha_2, \alpha_3, \alpha_4]_{\alpha 01+2\Delta\alpha 0}$; and (h) repeating above Steps (e)–(g) until the steering angles $\alpha_1, \alpha_2, \alpha_3, \alpha_4$ reach the steering angles $[\alpha_1, \alpha_2, \alpha_3, \alpha_4]_{\alpha 02}$ corresponding to the steering command value $\alpha_{02}$.

19. A four-wheel-independent-steering-vehicle steering control method as recited in claim 18, wherein the steering constraint condition equations for forming the prescribed steering mode are $$\alpha_1 = -\alpha_3 = \tan^{-1}\left(\frac{1}{\frac{1}{\tan\alpha_0} - \frac{W}{L}}\right)$$

$$\alpha_2 = -\alpha_4 = \tan^{-1}\left(\frac{1}{\frac{1}{\tan\alpha_0} + \frac{W}{L}}\right) \text{ and}$$

$$n_1:n_2:n_3:n_4 = \sqrt{\left(\frac{L}{\tan\alpha_0} - W\right)^2 + L^2} : \sqrt{\left(\frac{L}{\tan\alpha_0} + W\right)^2 + L^2} : \sqrt{\left(\frac{L}{\tan\alpha_0} - W\right)^2 + L^2} : \sqrt{\left(\frac{L}{\tan\alpha_0} + W\right)^2 + L^2}$$

where $\alpha_1, \alpha_2, \alpha_3$, and $\alpha_4$ are the steering angles of the right front wheel, left front wheel, right rear wheel, and left rear wheel, respectively;

n1, n2, n3, and n4 are the speeds of rotation of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels; and $\alpha_o$, which is used as the steering command value, is the angle formed between the center line Y between the left and right wheels of the vehicle, and the direction of travel of the point Po, which is the center point on a line connecting the left and right front wheels.

20. A four-wheel-independent-steering-vehicle steering control method as recited in claim 18, wherein the steering constraint condition equations for forming the prescribed steering mode are $$\alpha_1 = \tan^{-1}\left(\frac{1}{\frac{1}{\tan\alpha_0} - \frac{W}{2L}}\right)$$

$$\alpha_2 = \tan^{-1}\left(\frac{1}{\frac{l}{\tan\alpha_0} + \frac{W}{2L}}\right)$$

$$\alpha_3 = \alpha_4 = 0$$

and $$n_1:n_2:n_3:n_4 = \sqrt{\left(\frac{2L}{\tan\alpha_0} - W\right)^2 + (2L)^2} : \sqrt{\left(\frac{2L}{\tan\alpha_0} + W\right)^2 + (2L)^2} : \left|\frac{2L}{\tan\alpha_0} - W\right| : \left|\frac{2L}{\tan\alpha_0} + W\right| \text{ where}$$

where $\alpha_1, \alpha_2, \alpha_3$, and $\alpha_4$ are the steering angles of the right front wheel, left front wheel, right rear wheel, and left rear wheel, respectively;

n1, n2, n3, and n4 are the speeds of rotation of the right front wheel, left front wheel, right rear wheel, and left rear wheel, respectively;

L is the distance between each wheel and a center line X between the front wheels and rear wheels;

W is the distance between each wheel and a center line Y between the left wheels and right wheels; and $\alpha_o$, which is used as the steering command value, is the angle formed between the center line Y between the left and right wheels of the vehicle, and the direction of travel of the point Po, which is the center point on a line connecting the left and right front wheels.

* * * * *

UNITED STATES PATENT AND TRADEMARK OFFICE
CERTIFICATE OF CORRECTION

PATENT NO. : 7,184,869 B2
APPLICATION NO. : 10/822610
DATED : February 27, 2007
INVENTOR(S) : Hiroyasu Oshima et al.

It is certified that error appears in the above-identified patent and that said Letters Patent is hereby corrected as shown below:

On the Title Page

In column 1, item (75), after "Imai," delete "Nagano" and substitute --Minamisaku-- in its place.

In the Claims

Column 32, in claim 6, line 33, immediately after "$\alpha_4]_{R1+2\Delta R}$" delete ";and" and substitute -- and-- in its place.

Column 35, in claim 11, in the first equation, delete "$Yn$" and substitute --$L + Yn$-- in its place.

Column 35, in claim 11, in the second equation, delete "$Yn$" and substitute --$L + Yn$-- in its place.

Column 36, in claim 14, in the first equation, delete "$Yn$" and substitute --$L + Yn$-- in its place.

Column 36, in claim 14, in the second equation, delete "$Yn$" and substitute --$L + Yn$-- in its place.

Column 36, in claim 14, in the third equation, delete "$Yn$" and substitute --$L + Yn$-- in its place.

Column 36, in claim 14, in the fourth equation, delete "$Yn$" and substitute --$L + Yn$-- in its place (in all three occurrences).

Column 37, in claim 15, line 2 in subparagraph (h), before "$\alpha_2, \alpha_3, \alpha_4$ reach", delete $\alpha_n$, and substitute --$\alpha_1$,-- in its place.

UNITED STATES PATENT AND TRADEMARK OFFICE
CERTIFICATE OF CORRECTION

PATENT NO. : 7,184,869 B2
APPLICATION NO. : 10/822610
DATED : February 27, 2007
INVENTOR(S) : Hiroyasu Oshima et al.

It is certified that error appears in the above-identified patent and that said Letters Patent is hereby corrected as shown below:

Column 38-39, in claim 18, line 3 in subparagraph (e), before "corre-" delete "an".

Signed and Sealed this

Twenty-eighth Day of August, 2007

JON W. DUDAS
*Director of the United States Patent and Trademark Office*